United States Patent
Martin et al.

(10) Patent No.: US 12,351,752 B2
(45) Date of Patent: *Jul. 8, 2025

(54) FLUOROPOLYMER AND LIQUID CRYSTAL POLYMER BLEND

(71) Applicants: DAIKIN AMERICA, INC., Orangeburg, NY (US); DAIKIN INDUSTRIES, LTD., Osaka (JP)

(72) Inventors: Arthur W. Martin, Decatur, AL (US); Dakarai K. Brown, Hopkins, MN (US); Kyle R. Ptak, Decatur, AL (US); Halie Martin, Huntsville, AL (US); Anna Veronica Walter, Huntsville, AL (US)

(73) Assignees: DAIKIN AMERICA, INC., Orangeburg, NY (US); DAIKIN INDUSTRIES, LTD., Osaka (JP)

( * ) Notice: Subject to any disclaimer, the term of this patent is extended or adjusted under 35 U.S.C. 154(b) by 33 days.

This patent is subject to a terminal disclaimer.

(21) Appl. No.: 18/177,828

(22) Filed: Mar. 3, 2023

(65) Prior Publication Data

US 2023/0203375 A1 Jun. 29, 2023

Related U.S. Application Data

(63) Continuation of application No. PCT/JP2021/032446, filed on Sep. 3, 2021.

(60) Provisional application No. 63/074,631, filed on Sep. 4, 2020.

(51) Int. Cl.
| | | |
|---|---|---|
| *G02F 1/1333* | (2006.01) | |
| *C09K 19/06* | (2006.01) | |
| *C09K 19/12* | (2006.01) | |
| *C09K 19/54* | (2006.01) | |

(52) U.S. Cl.
CPC ............ *C09K 19/12* (2013.01); *C09K 19/062* (2013.01); *C09K 19/542* (2013.01); *C09K 2019/122* (2013.01); *C09K 2019/546* (2013.01)

(58) Field of Classification Search
CPC .... C09K 19/12; C09K 19/062; C09K 19/542; C09K 19/38; C09K 2019/546; C09K 2019/0444; G02F 1/1333
See application file for complete search history.

(56) References Cited

U.S. PATENT DOCUMENTS

| | | |
|---|---|---|
| 8,460,795 B2 | 6/2013 | Anderson et al. |
| 2001/0006727 A1 | 7/2001 | Lee et al. |
| 2003/0204021 A1 | 10/2003 | Lee et al. |
| 2005/0197460 A1 | 9/2005 | Patel et al. |
| 2007/0078209 A1 | 4/2007 | Jozokos et al. |
| 2007/0200274 A1 | 8/2007 | Lee et al. |
| 2014/0183420 A1 | 7/2014 | Kamoi et al. |
| 2017/0226389 A1 | 8/2017 | Wang et al. |
| 2018/0015647 A1 | 1/2018 | Kramb et al. |
| 2018/0371227 A1 | 12/2018 | Morken et al. |
| 2021/0032453 A1 | 2/2021 | Martin et al. |
| 2022/0267582 A1 | 8/2022 | Martin et al. |
| 2023/0203292 A1* | 6/2023 | Martin ............... C08L 27/12 525/68 |
| 2023/0203375 A1* | 6/2023 | Martin ............... C09K 19/12 252/299.66 |

FOREIGN PATENT DOCUMENTS

| | | |
|---|---|---|
| CN | 104530719 A | 4/2015 |
| CN | 105838160 A | 8/2016 |
| CN | 110511533 A | 11/2019 |
| EP | 0 728 776 A1 | 8/1996 |
| EP | 0 969 045 A1 | 1/2000 |
| JP | 9-309961 A | 12/1997 |
| JP | 2001-181463 A | 7/2001 |
| JP | 2011-140536 A | 7/2011 |
| WO | 94/14890 A1 | 7/1994 |
| WO | 2017/053880 A1 | 3/2017 |
| WO | 2022/050378 A1 | 3/2022 |
| WO | 2022/050379 A1 | 3/2022 |

OTHER PUBLICATIONS

Extended European Search Report issued Jun. 19, 2023 in European Application No. 20859029.9.
International Preliminary Report on Patentability with Written Opinion dated Mar. 1, 2022 in related International Application No. PCT/JP2020/032691.
International Search Report with Written Opinion dated Nov. 24, 2020 in related International Application No. PCT/JP2020/032691.
International Search Report with Written Opinion dated Nov. 16, 2021 in related International Application No. PCT/JP2021/032454 (published as WO 2022/050379).
International Search Report with Written Opinion dated Jan. 11, 2022 in counterpart International Application No. PCT/JP2021/032446 (published as WO 2022/050378).
Office Action dated Dec. 27, 2024 for related U.S. Appl. No. 17/668,048.
Extended European Search Report issued Sep. 5, 2024 in Application No. 21864430.0.
Extended European Search Report issued Aug. 14, 2024 in related European Application No. 21864431.8.

* cited by examiner

*Primary Examiner* — Geraldina Visconti
(74) *Attorney, Agent, or Firm* — Sughrue Mion, PLLC

(57) ABSTRACT

A polymer blend is provided of a fluoropolymer and a liquid crystal polymer. The blend is achieved using a compatibilizer composition that contains a copolymer having a fluorine-containing monomer and a liquid crystal monomer.

21 Claims, 20 Drawing Sheets

[Fig. 1]
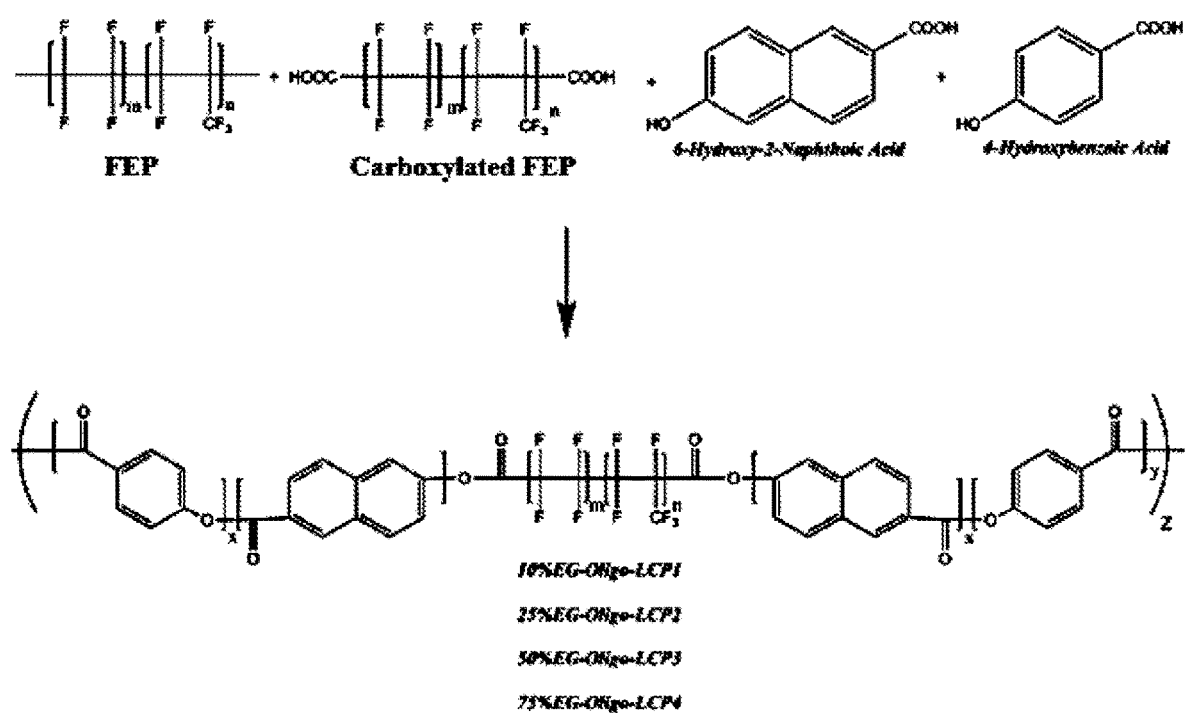

[Fig. 2]
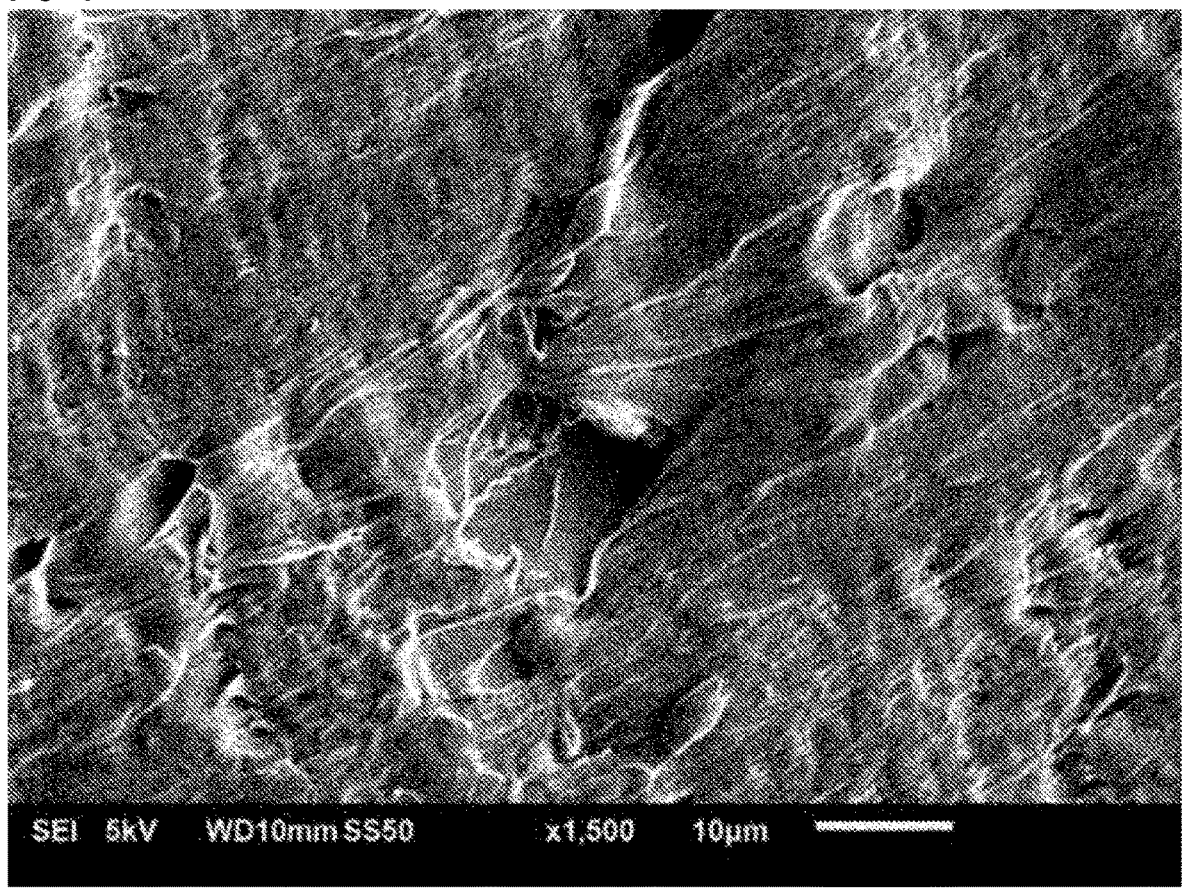

[Fig. 3]
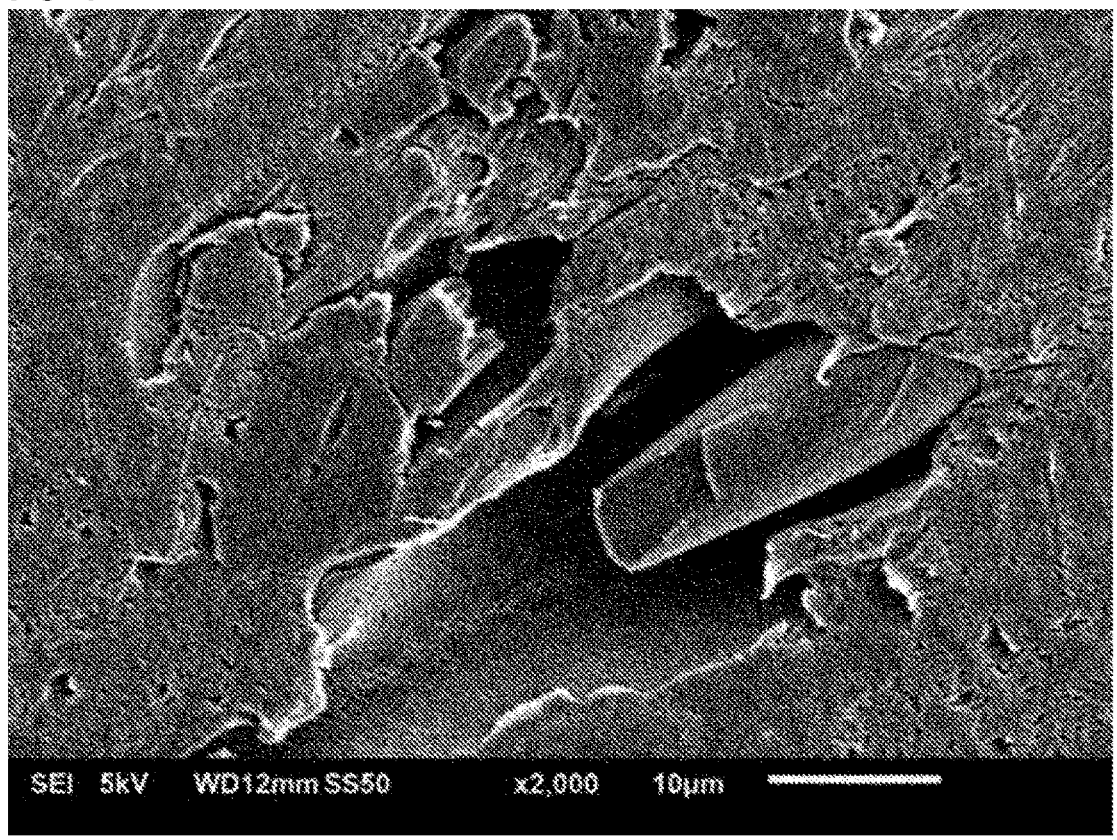
[Fig. 4]
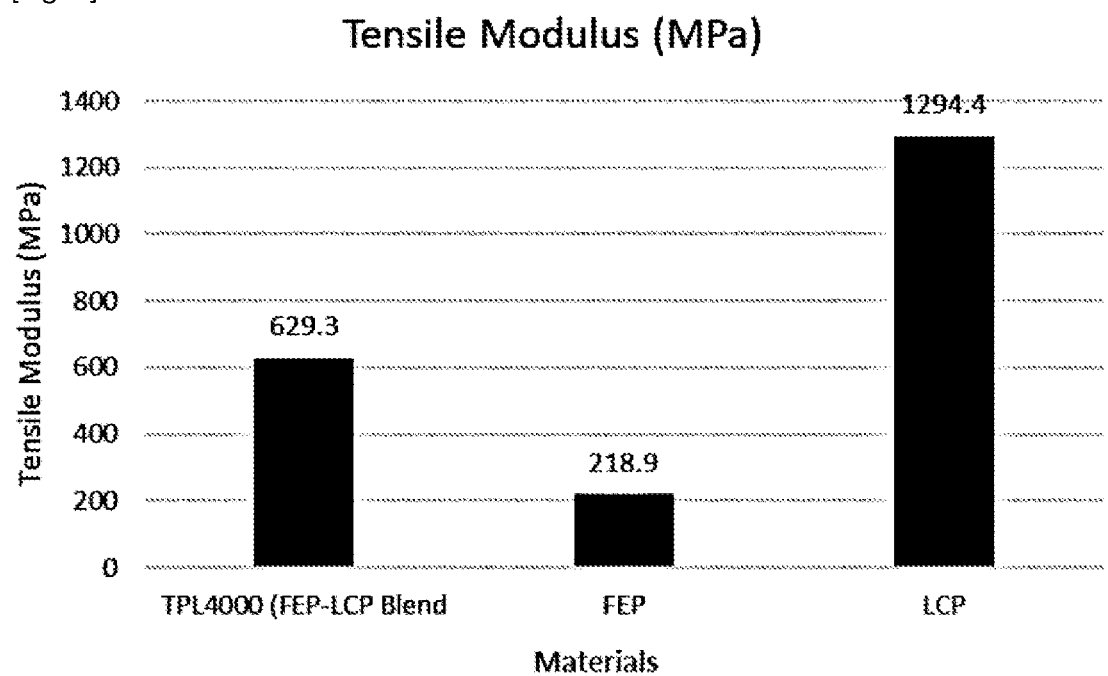

[Fig. 5]
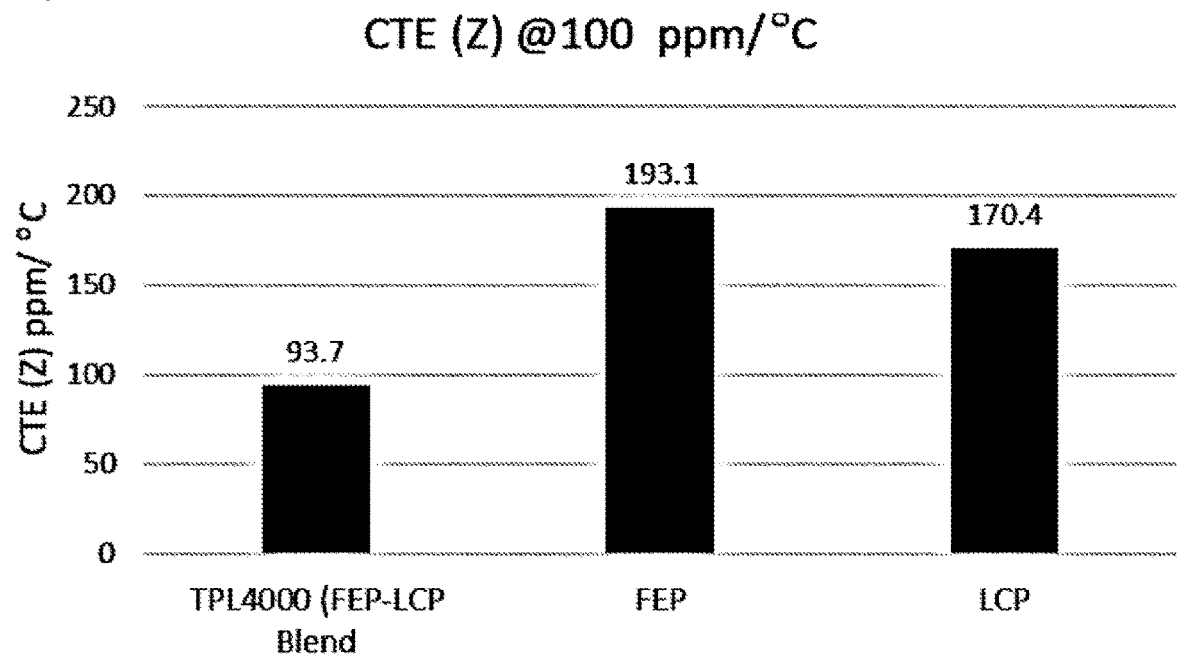
[Fig. 6]
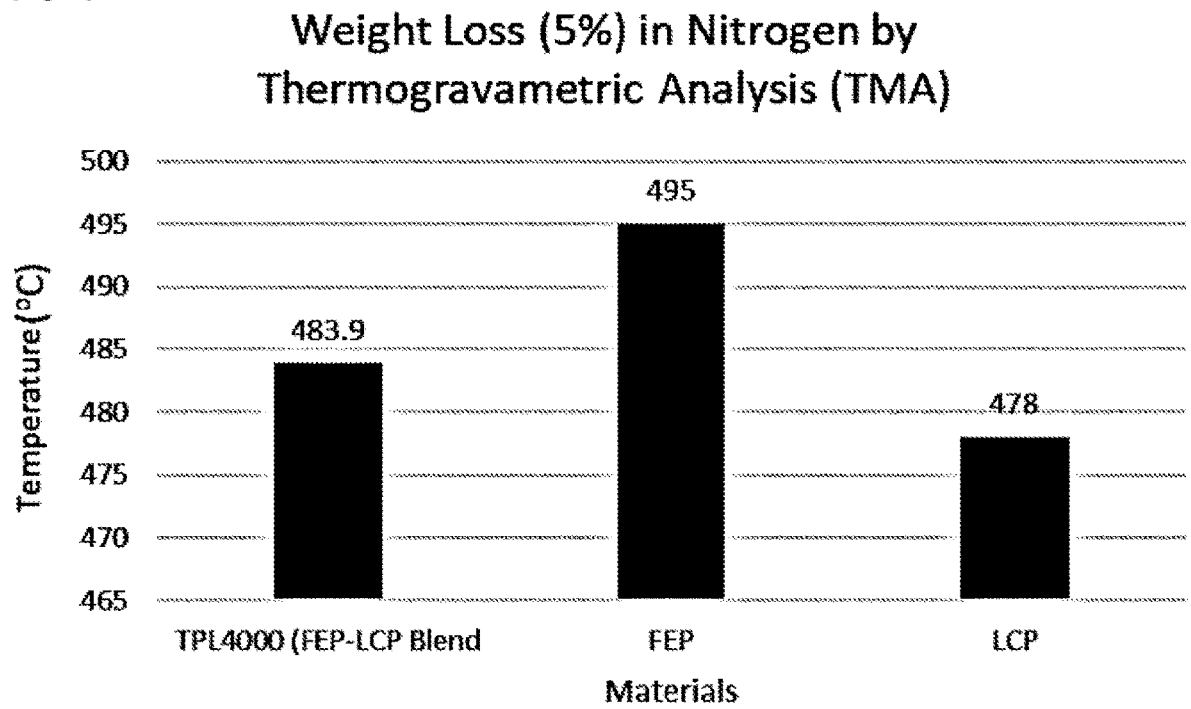

[Fig. 7]
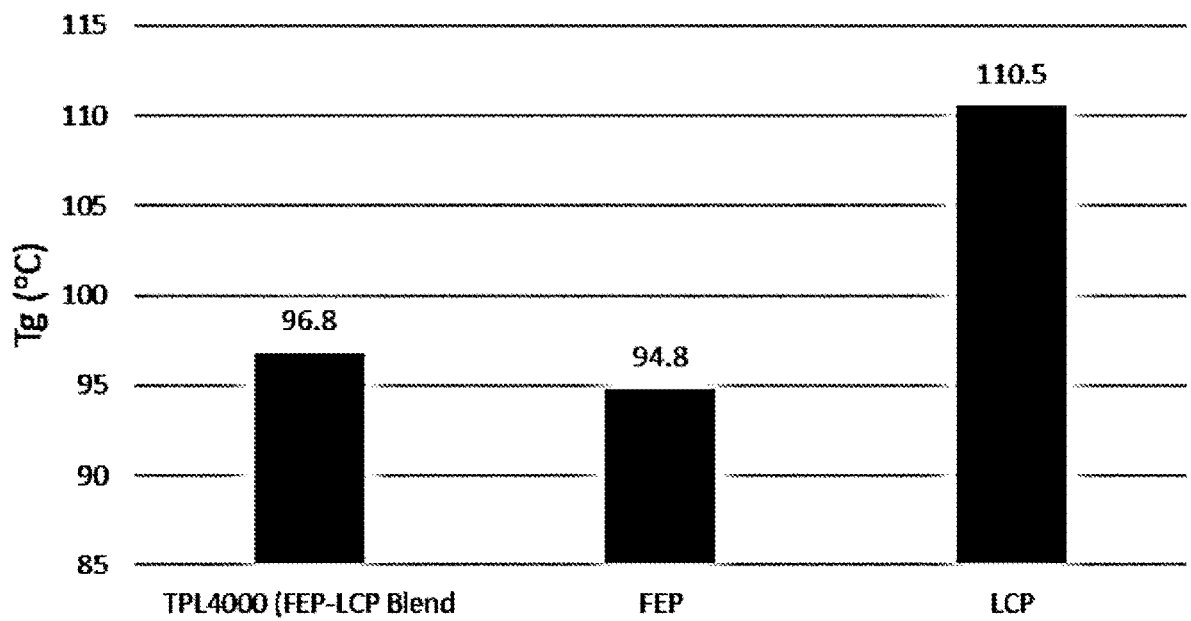
[Fig. 8]
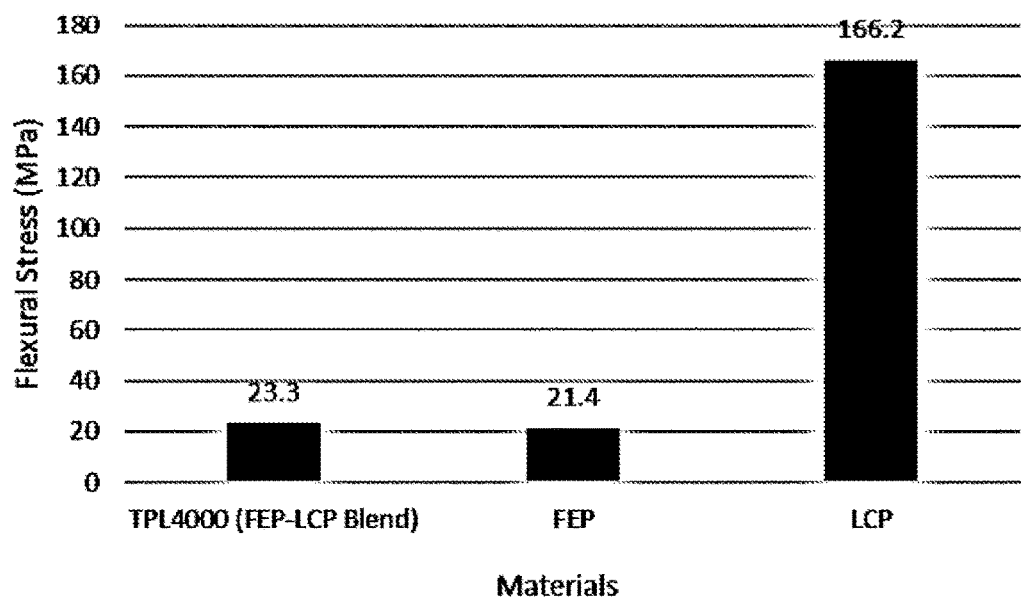

[Fig. 9]
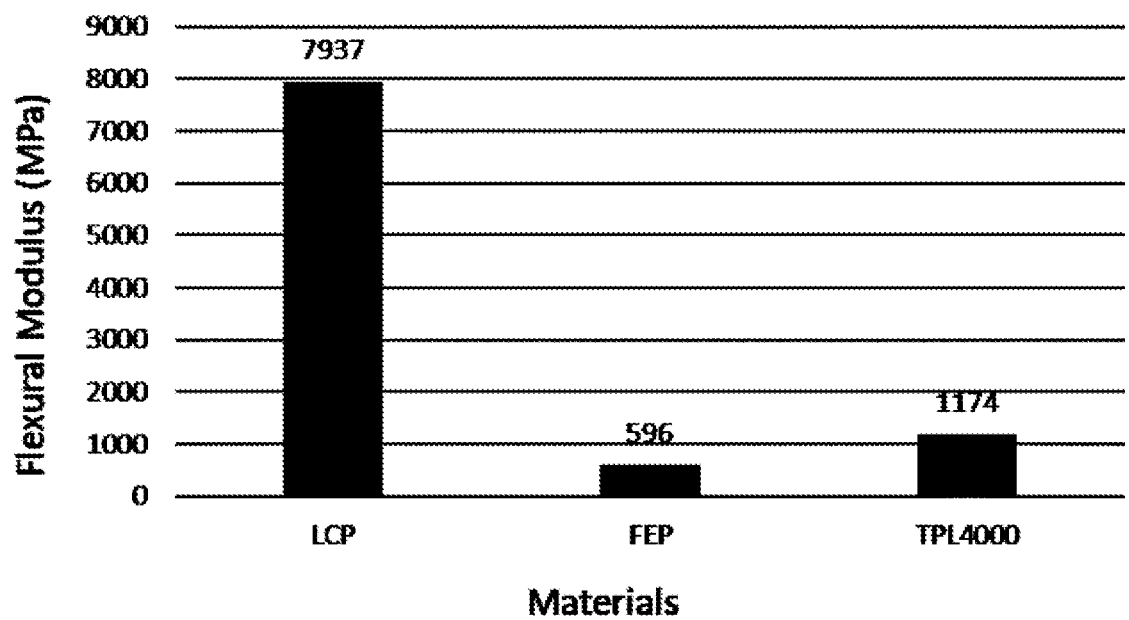
[Fig. 10]
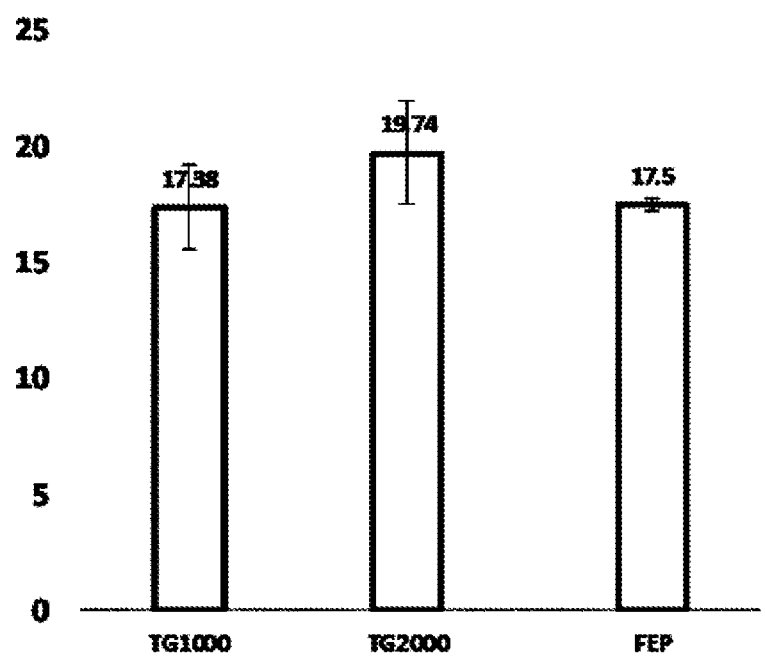

[Fig. 11]
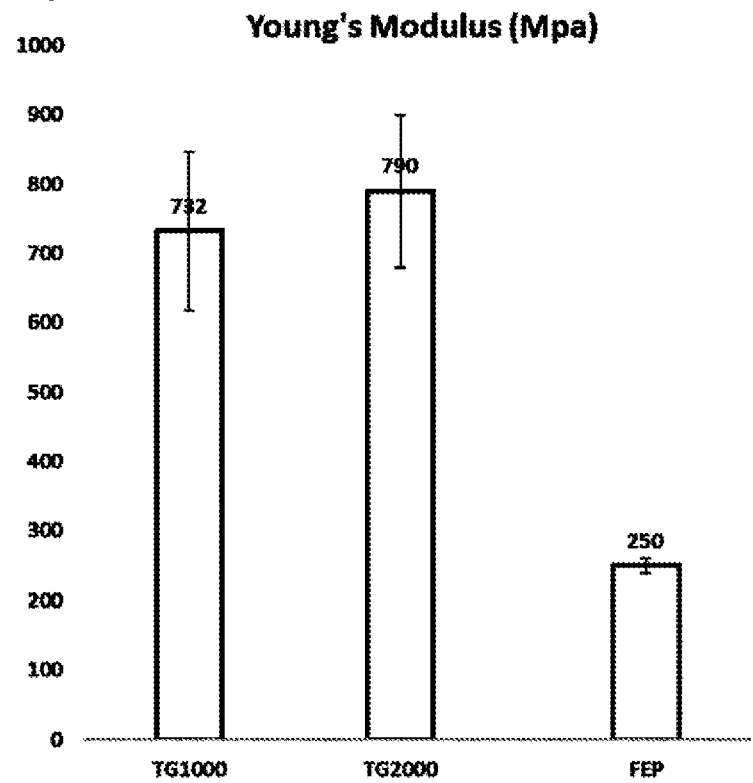
[Fig. 12]
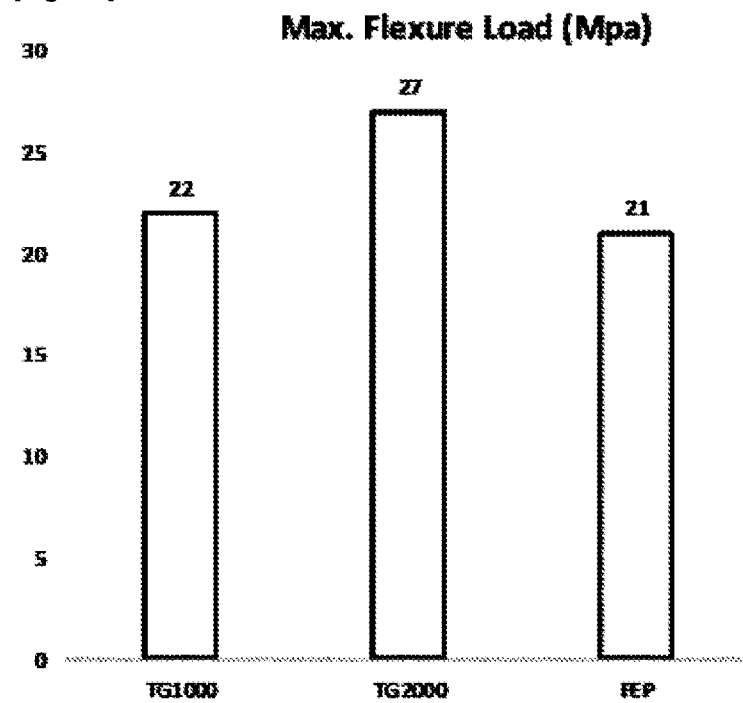

[Fig. 13]
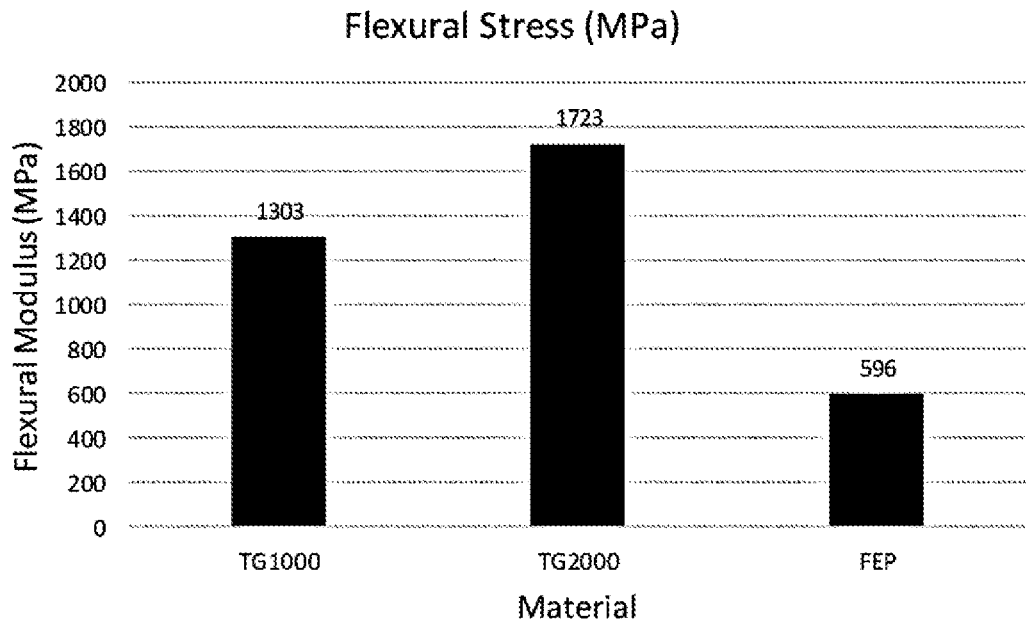
[Fig. 14]
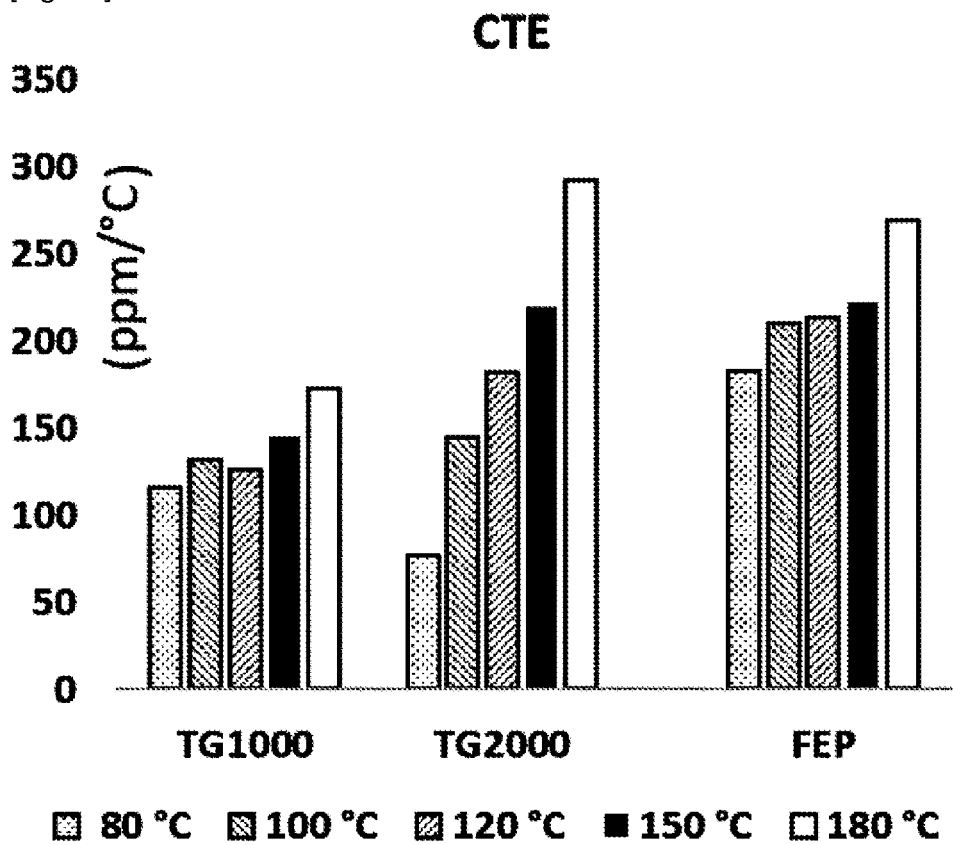

[Fig. 15]
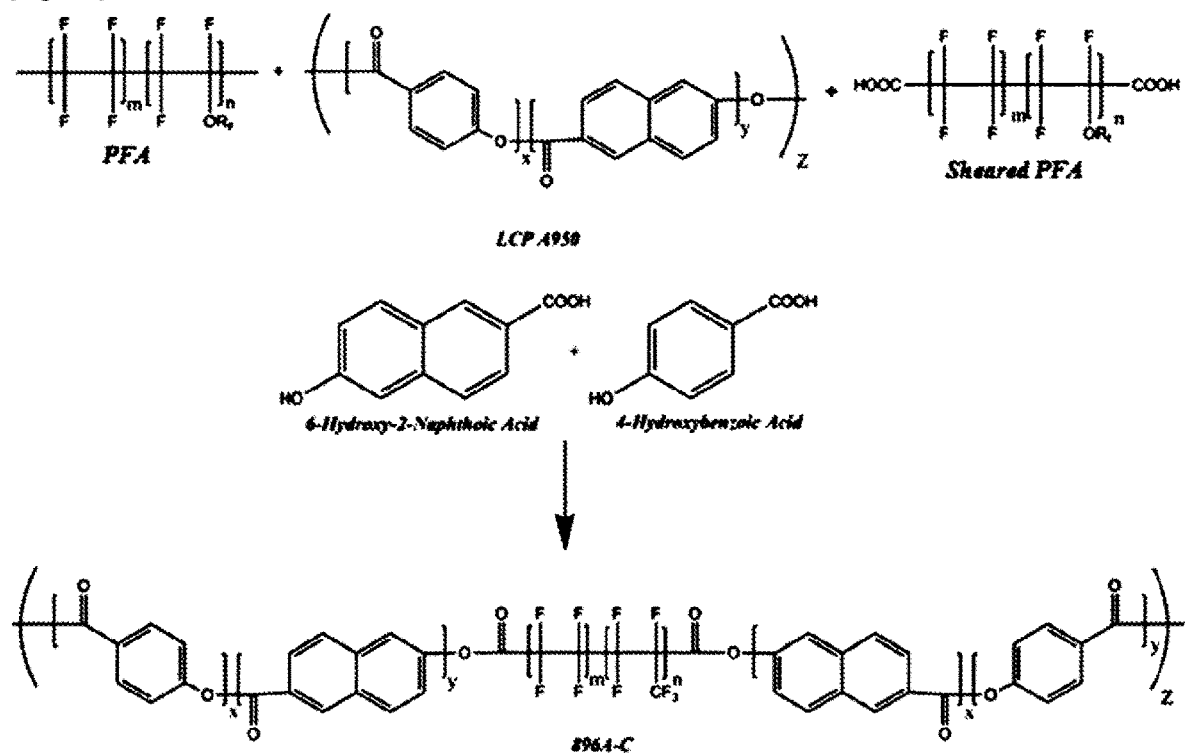
[Fig. 16]
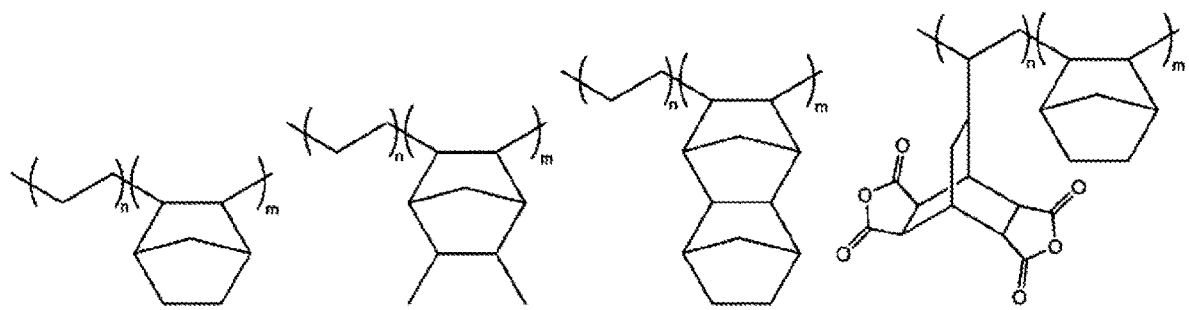
Exemplary Copolymers of Cyclic Olefins (COC) Structures

[Fig. 17]
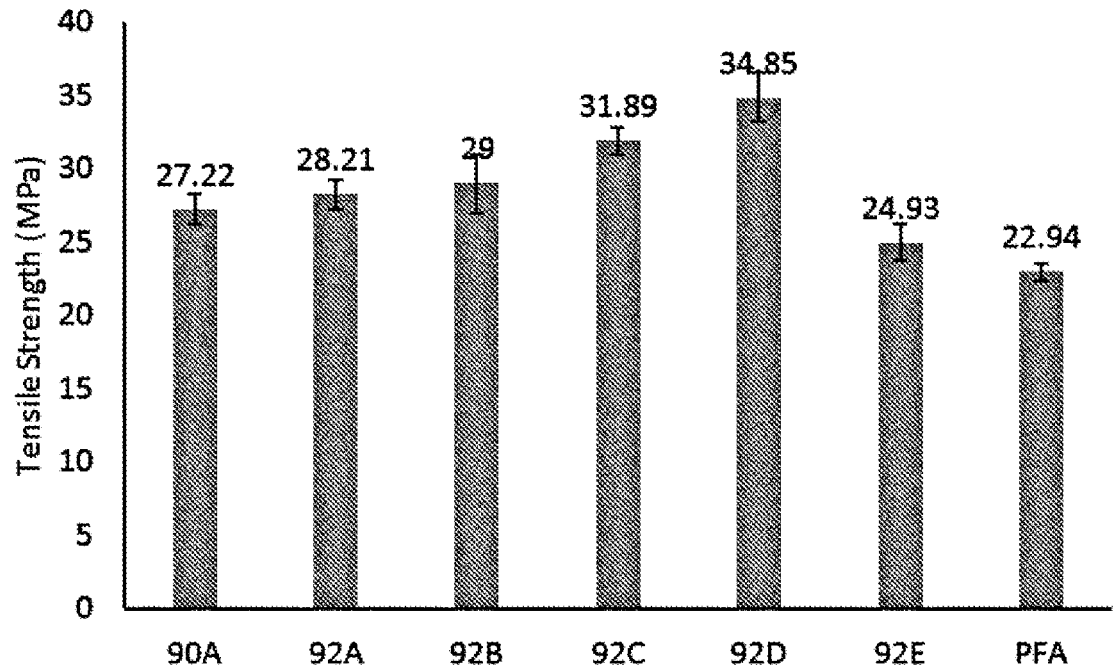
[Fig. 18]
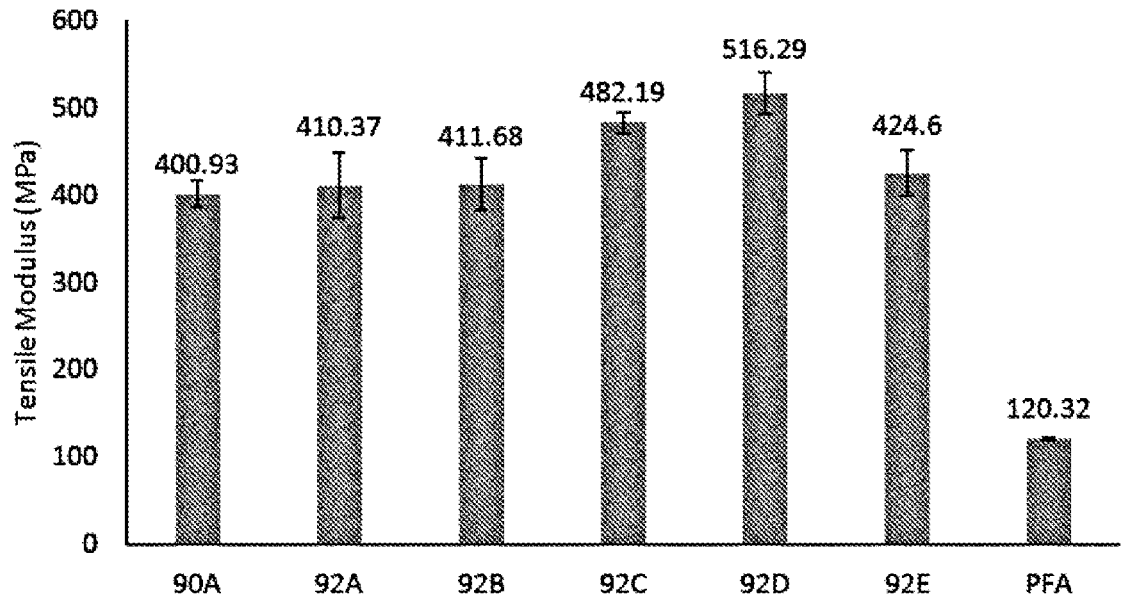

[Fig. 19]
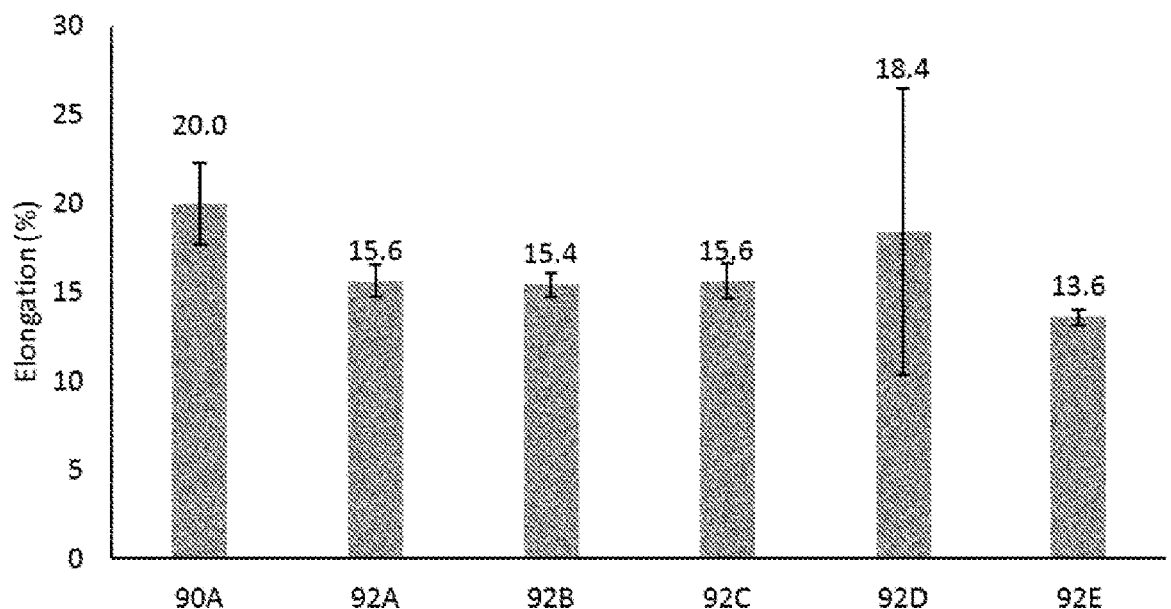
[Fig. 20]
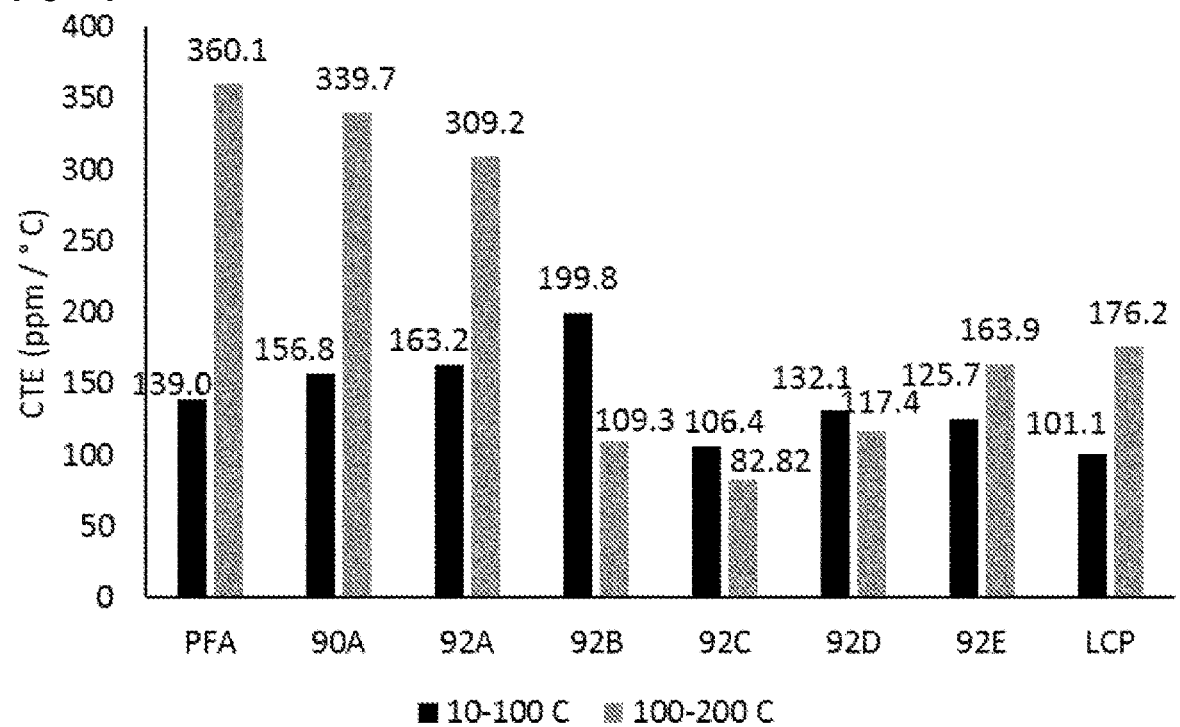

[Fig. 21]
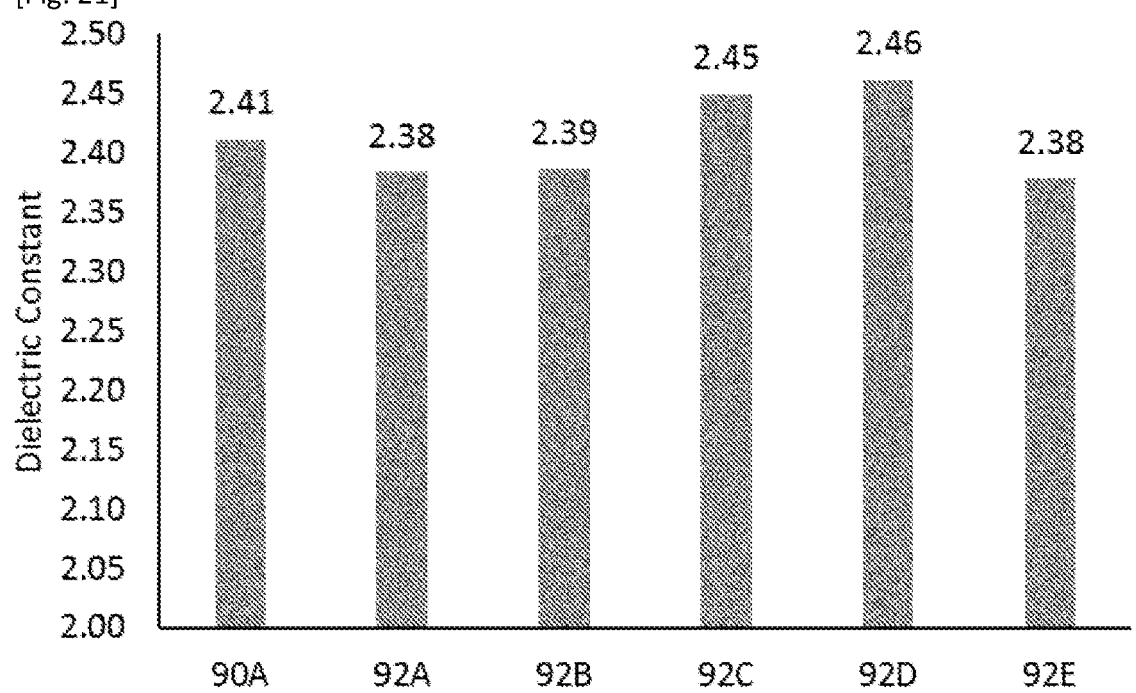
[Fig. 22]
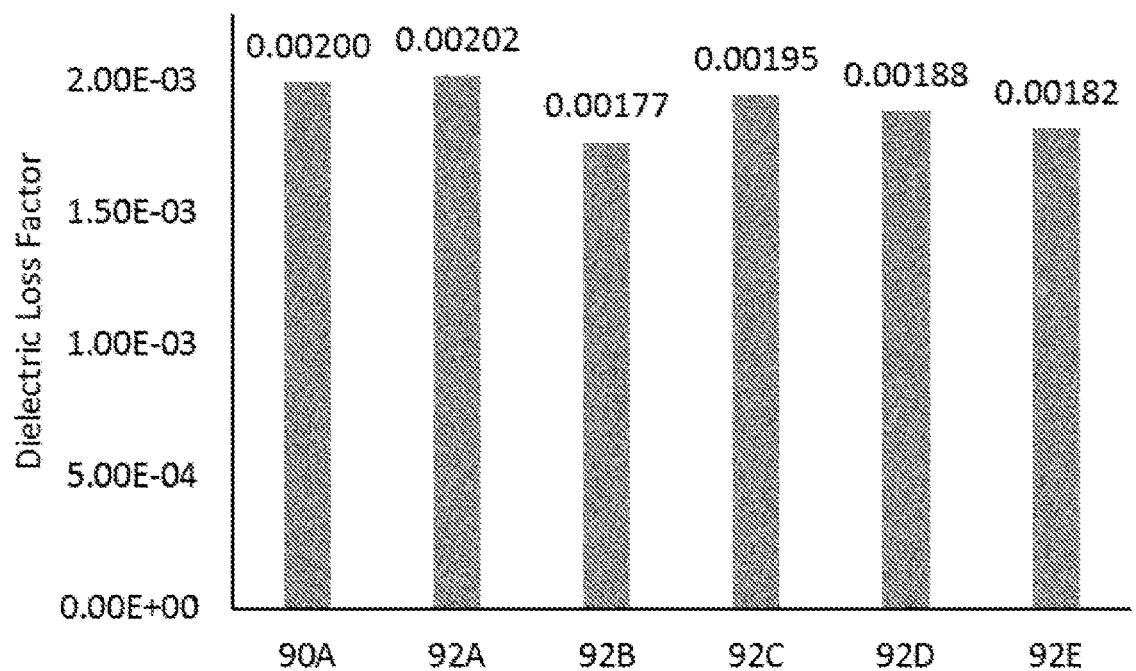

[Fig. 23]
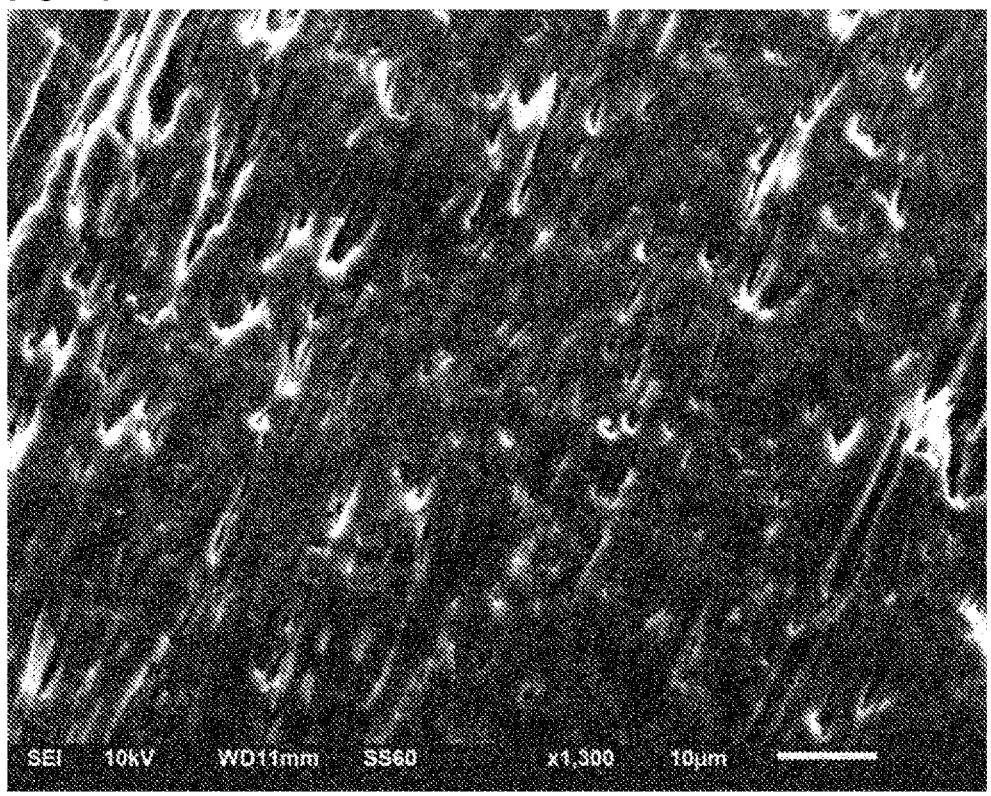
[Fig. 24]
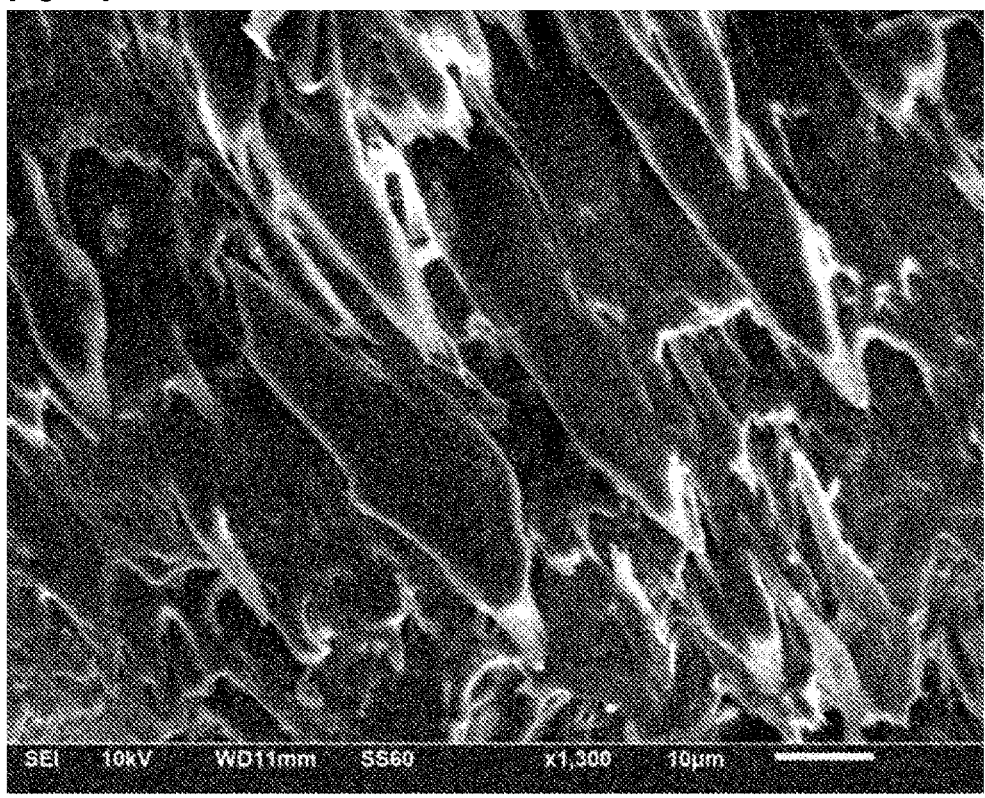

[Fig. 25]
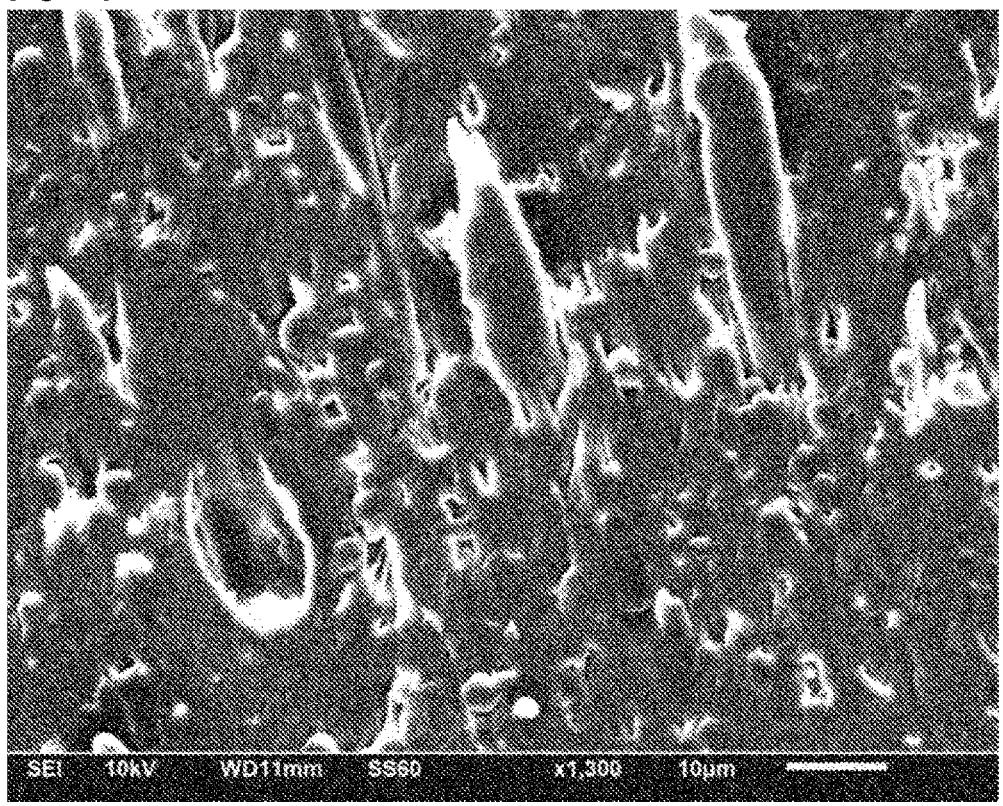
[Fig. 26]
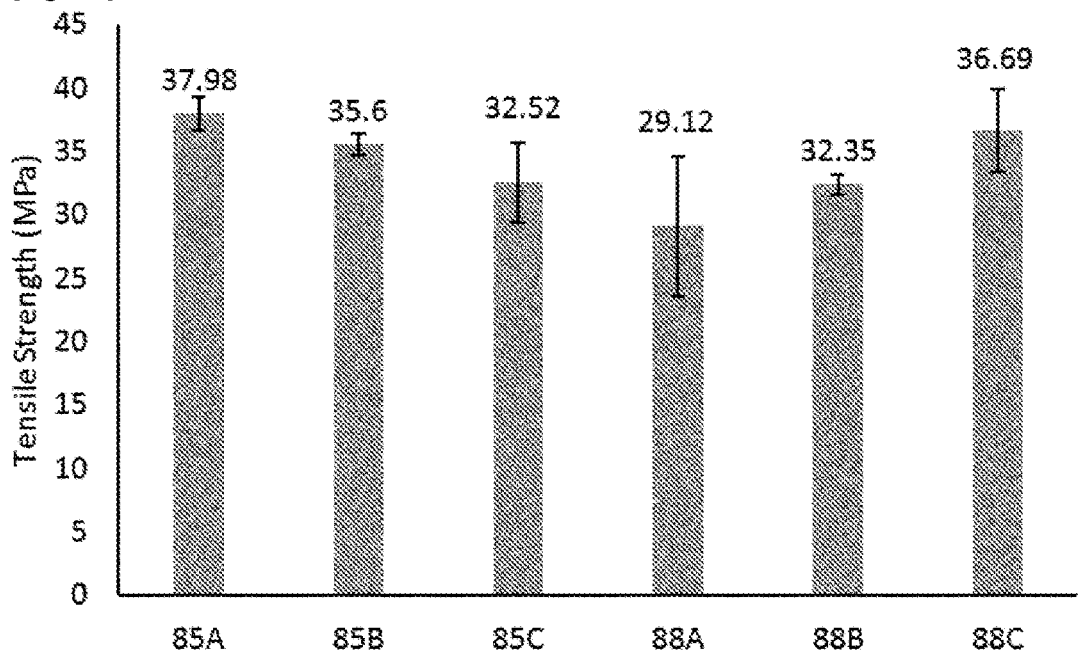

[Fig. 27]
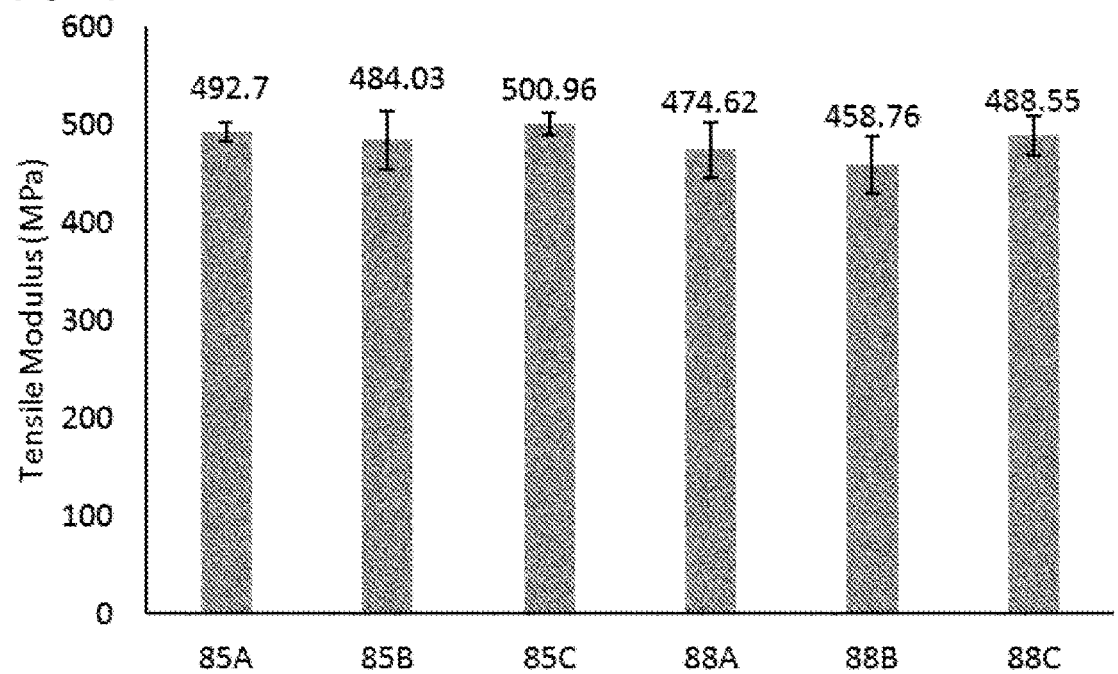
[Fig. 28]
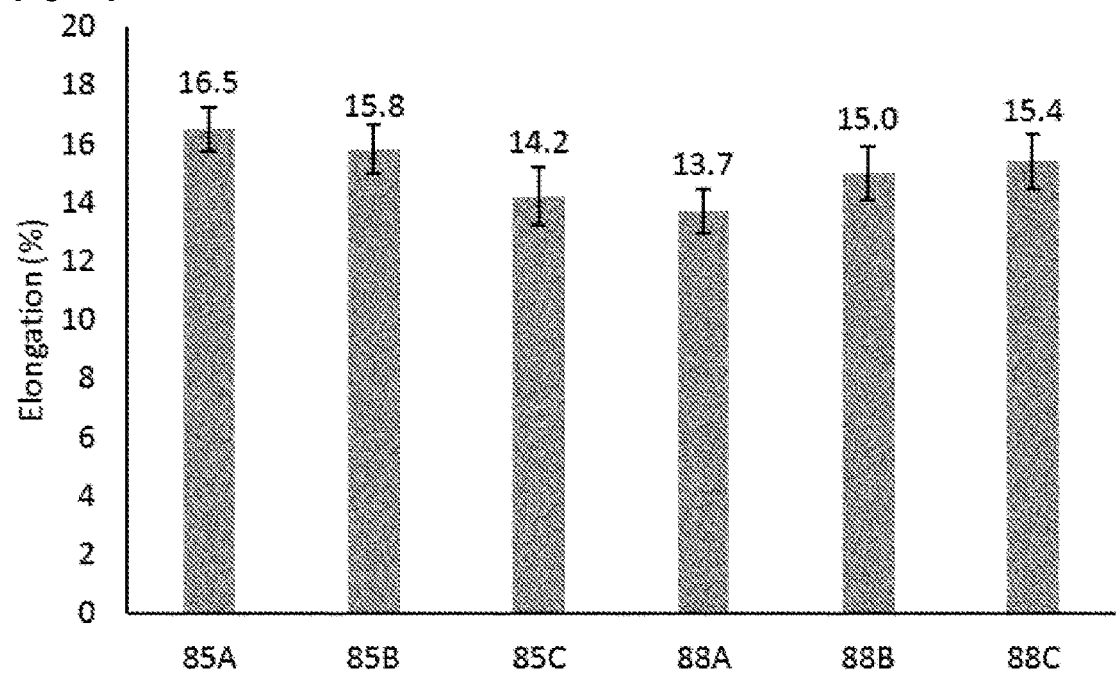

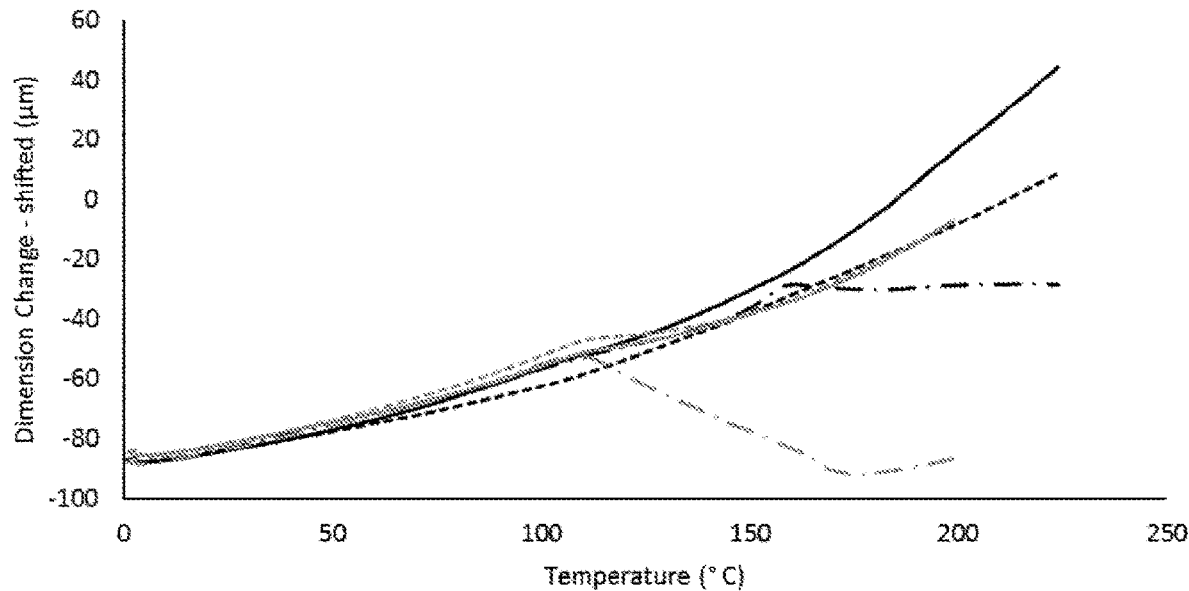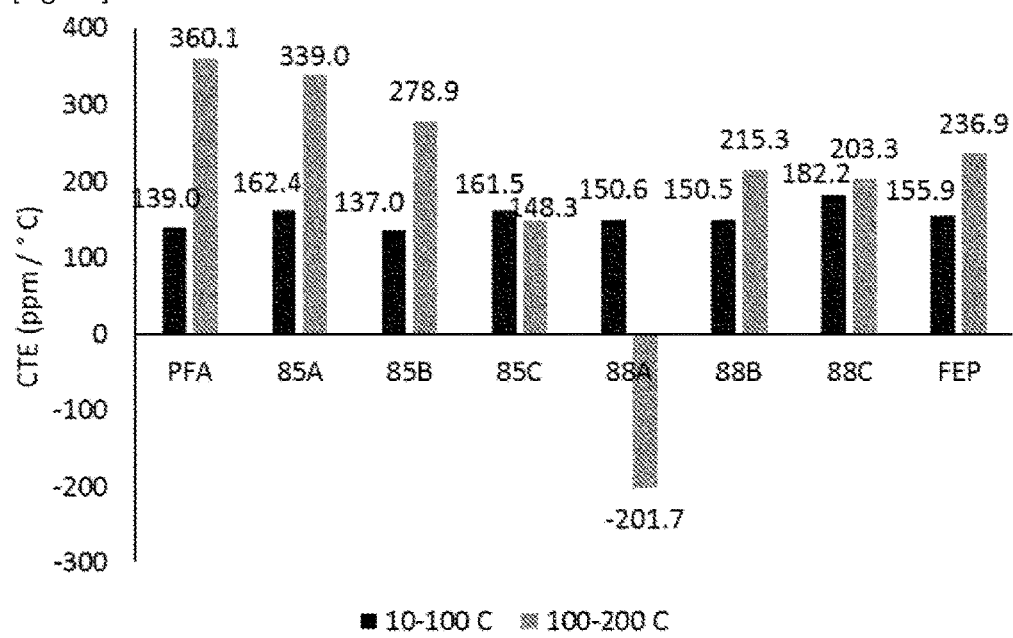

[Fig. 31]
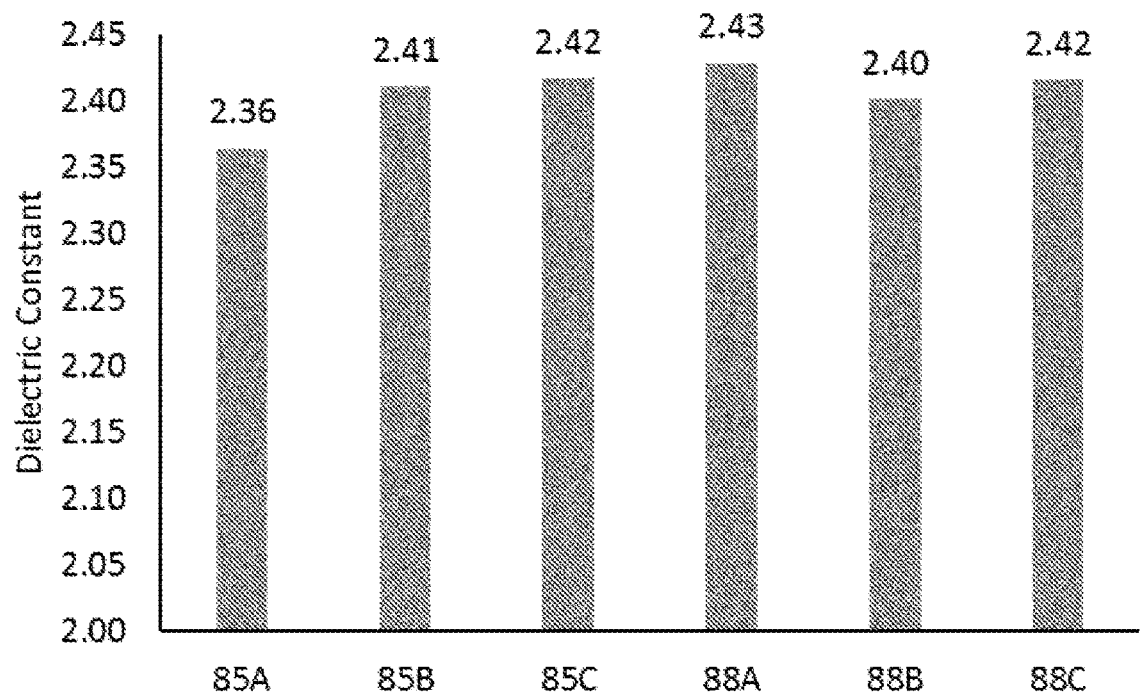
[Fig. 32]
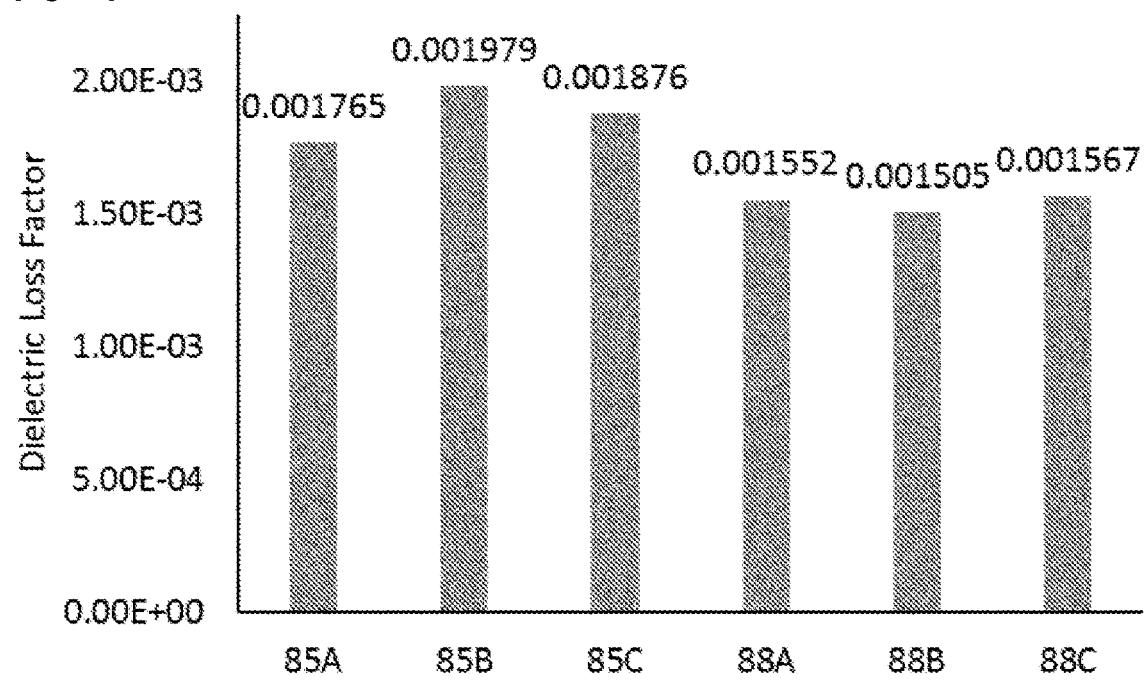

[Fig. 33]
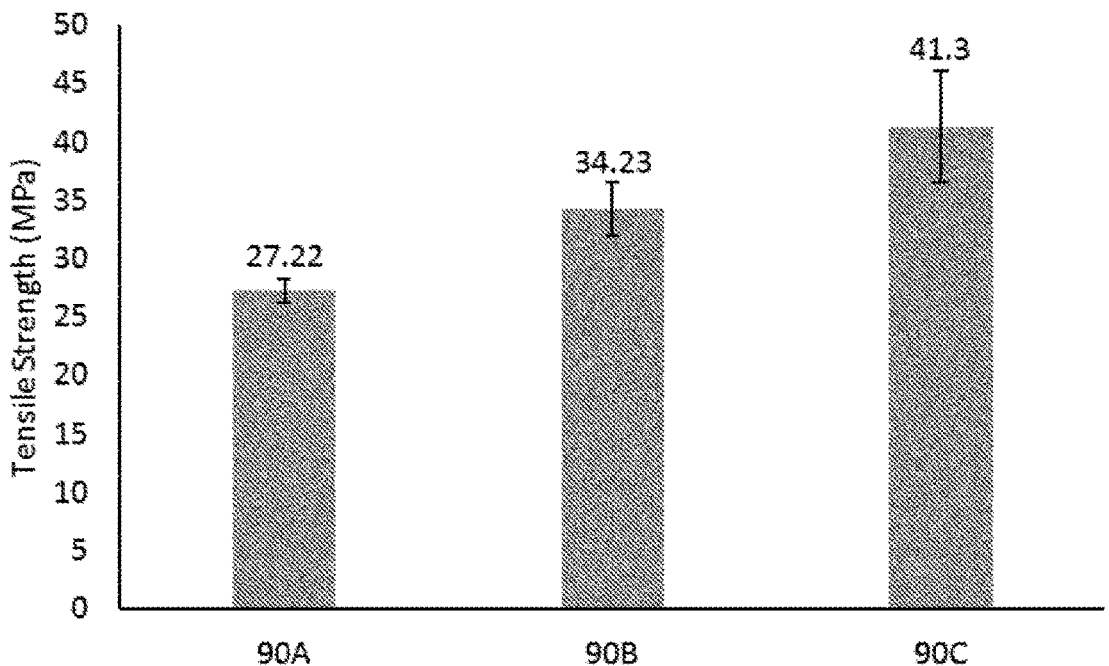
[Fig. 34]
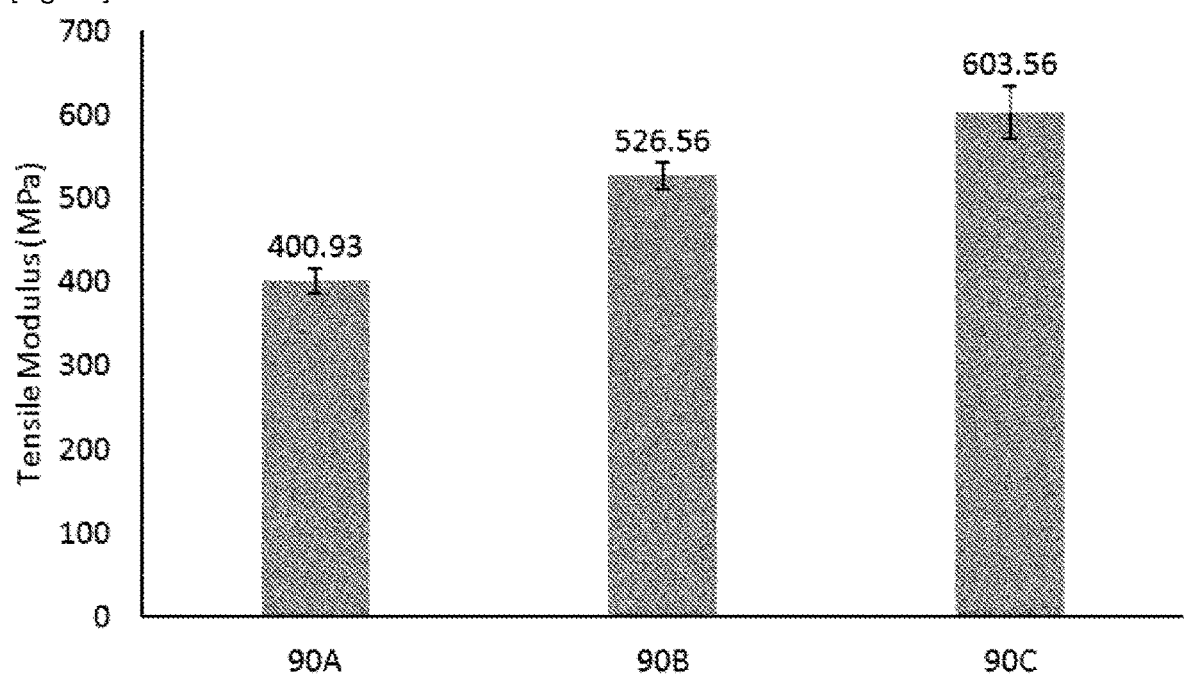

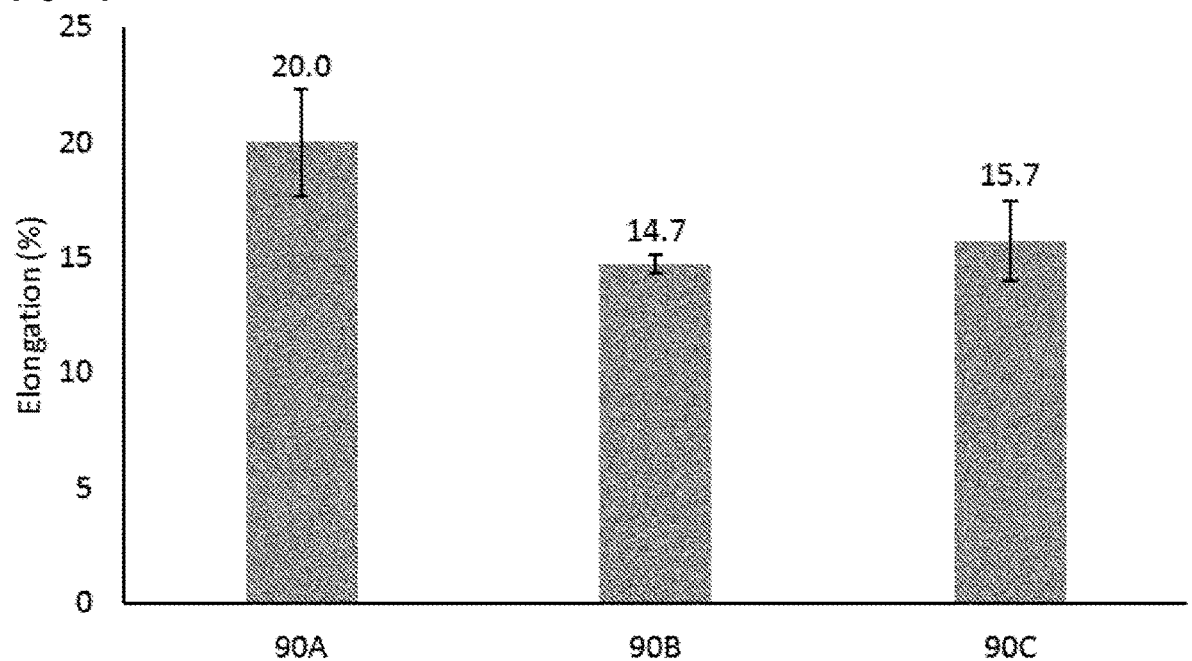
[Fig. 35]
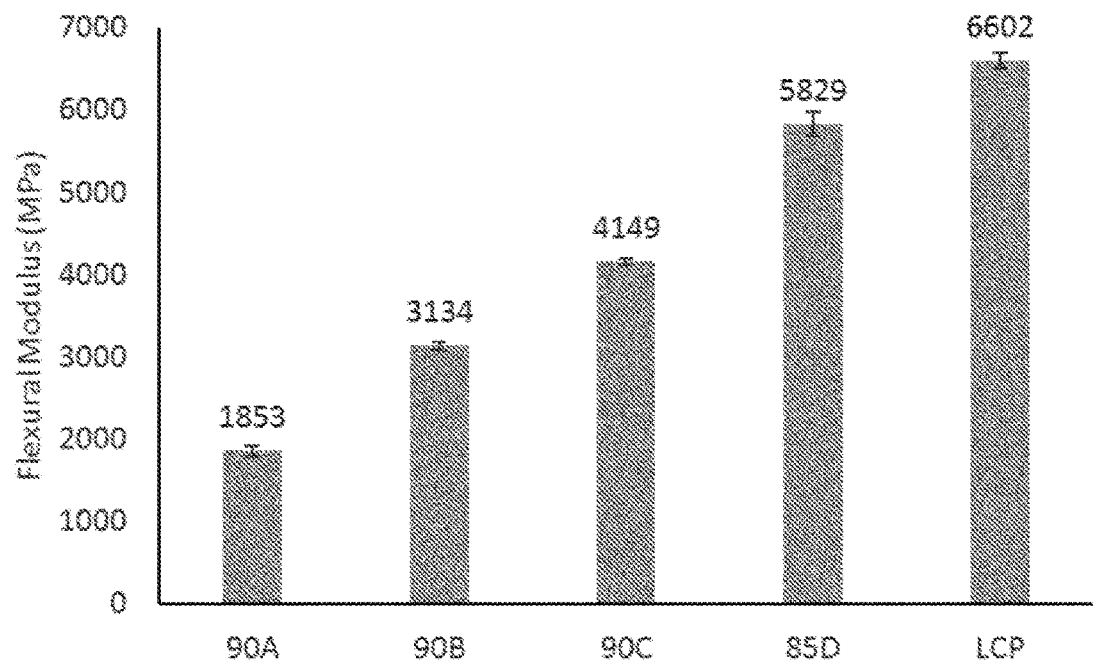
[Fig. 36]

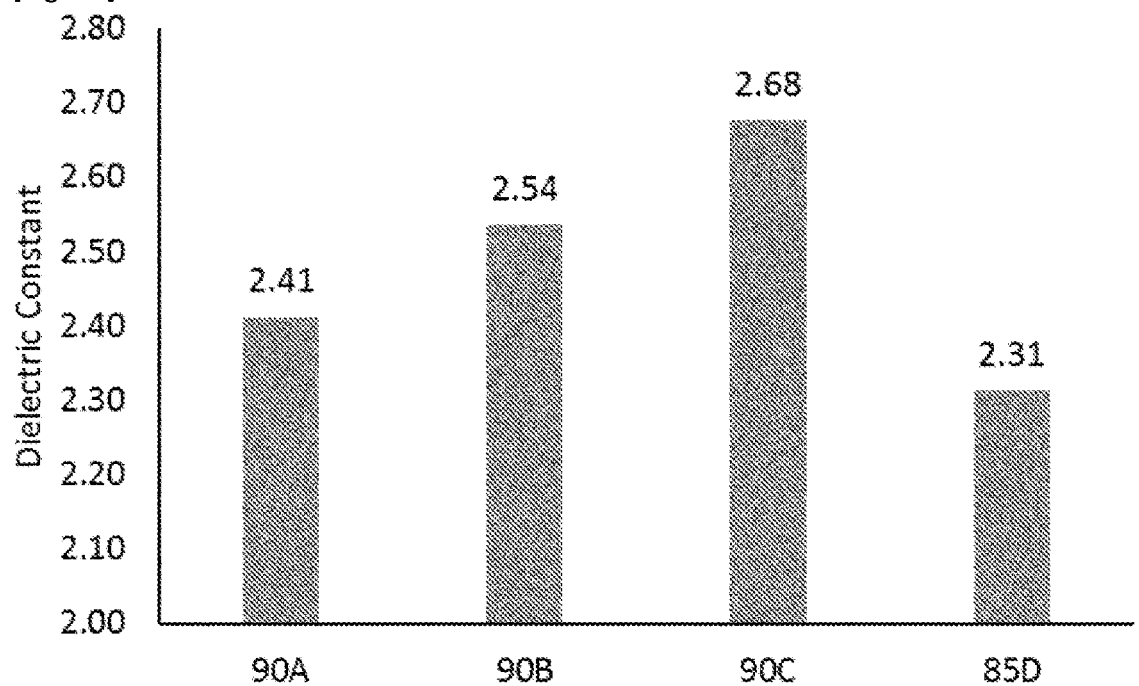
[Fig. 37]
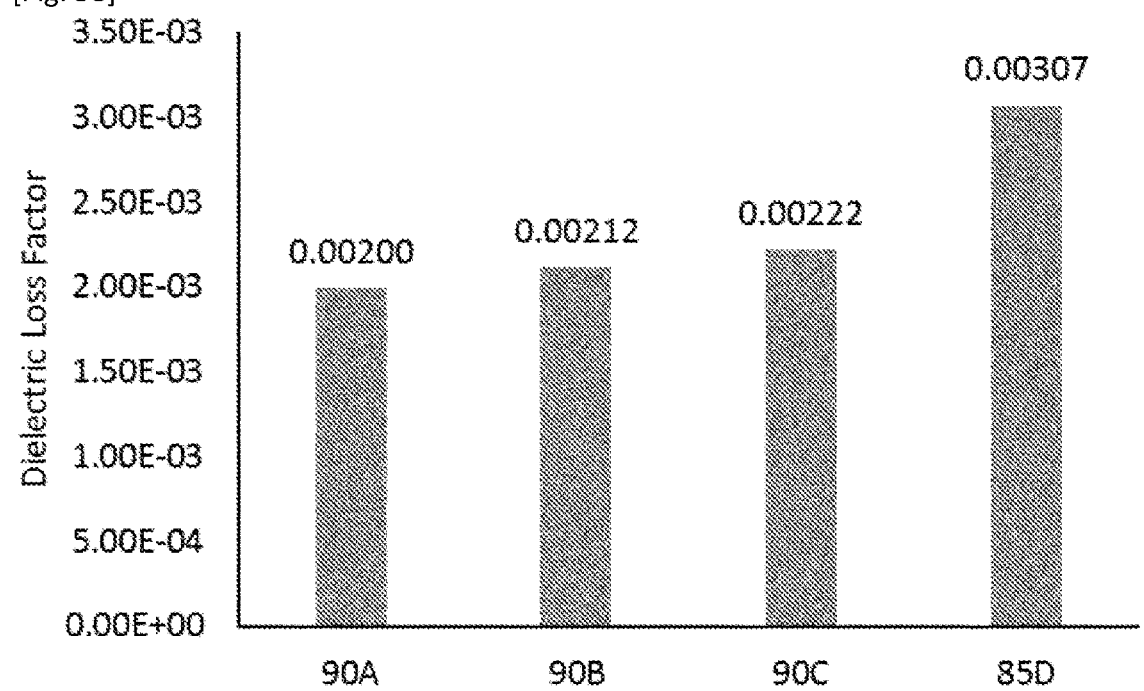
[Fig. 38]

FLUOROPOLYMER AND LIQUID CRYSTAL POLYMER BLEND

CROSS-REFERENCE TO RELATED APPLICATION

This application is a Rule 53(b) Continuation of International Application No. PCT/JP2021/032446 filed Sep. 3, 2021, which claims priority based on U.S. Provisional Patent Application No. 63/074,631, filed Sep. 4, 2020, the respective disclosures of all of which are incorporated herein by reference in their entirety.

TECHNICAL FIELD

The present disclosure relates generally to polymer blends, methods of making polymer blends, methods of using polymer blends, compatibilizer compositions for use with polymer blends, and articles manufactured from polymer blends.

BACKGROUND ART

Printed circuit boards (PCBs) are integral components of many electronics. PCBs mechanically support and electrically connect electrical components using conductive tracks etched from sheet layers of copper laminated onto and/or between sheet layers of a non-conductive substrate. A PCB can be rigid, flexible, or rigid-flexible, and contain multiple laminates, each made of thermoplastic or thermoset polymeric materials. The materials used for the laminates in PCBs are often ranked by the value of their dielectric constant (Dk) and their dissipation factor (Df). The highest performing materials have the lowest Dk and Df.

Low Dk values and low Df values are useful properties for high speed digital and high frequency PCBs that are used in a variety of emerging markets, such as autonomous driving and fifth generation wireless communication (5G) devices (for example, radio frequency components, power amplifiers, and antennas). Low Dissipation Factor Df thermoplastic laminates are used in high frequency PCBs to enable high power applications and reduce the loss of energy generated by heat, which can degrade the quality of the signal. Low Dielectric Constant Dk laminates are also important in high speed digital PCBs for enabling rapid signal propagation.

Fluoropolymers (FPs) generally have excellent heat and chemical resistance and non-stick properties. While fluoropolymers exhibit excellent chemical properties, they have relatively weak mechanical properties when compared to specialty materials used in high performance PCB applications, such as liquid crystal polymers (LCPs) and polyimide (PI). Fluoropolymers also exhibit low surface energy and high coefficient of thermal expansion (CTE), which make it difficult to integrate these materials into PCB laminates.

Due to the low compatibility of FPs with other polymers, previous attempts to blend them have resulted in mixtures with poor structural integrity. Accordingly, there remains a need in the art for a fluorine-containing polymer composition having enhanced mechanical properties that may be used in, for example, high speed and high frequency PCB laminates.

SUMMARY

The present disclosure describes a blend of LCP and FP that addresses the problems described above by providing superior properties to either of LCP or FP. A compatibilizer composition is described for use in such blends. Some embodiments of the LCP/FP blend form a thermoplastic alloy with significantly enhanced mechanical properties, significantly reduced coefficient of thermal expansion, while maintaining thermal properties and improved electrical properties (specifically dielectric constant and dissipation factor) over the liquid crystal polymer.

In a first aspect, a copolymer of a fluorine-containing monomer and a liquid crystal monomer is provided.

In a second aspect, a compatibilizer composition is provided, comprising: a copolymer of a fluorine-containing monomer and a liquid crystal monomer.

In a third aspect, a polymer blend is provided comprising: a fluoropolymer, a liquid crystal polymer, and a compatibilizer composition, wherein the compatibilizer composition contains a copolymer having a fluorinated or non-fluorinated monomer and a liquid crystal monomer.

The above presents a simplified summary in order to provide a basic understanding of some aspects of the claimed subject matter. This summary is not an extensive overview. It is not intended to identify key or critical elements or to delineate the scope of the claimed subject matter. Its sole purpose is to present some concepts in a simplified form as a prelude to the more detailed description that is presented later.

BRIEF DESCRIPTION OF DRAWINGS

FIG. 1. An example of a scheme for producing a compatibilizer composition or a reactive polymer compatibilizer containing FEP.

FIG. 2. Scanning electron micrograph image of an embodiment of the reactive polymer compatibilizer at 1500× magnification.

FIG. 3. Scanning electron micrograph image of an embodiment of the reactive polymer compatibilizer at 2000× magnification.

FIG. 4. Tensile modulus of FEP, LCP, and an embodiment of blended FEP and LCP.

FIG. 5. Coefficient of thermal expansion (CTE) at 100° C. of FEP, LCP, and an embodiment of blended FEP and LCP.

FIG. 6. Thermal stability as measured by loss in nitrogen of FEP, LCP, and an embodiment of blended FEP and LCP. Y axis is the temperature at which 5% weight loss was observed.

FIG. 7. Glass transition temperatures of FEP, LCP, and an embodiment of blended FEP and LCP.

FIG. 8. Flexural stress at maximum flexure load of FEP, LCP, and an embodiment of blended FEP and LCP. Note that the maximum flexure load of the blend is lower than for the unblended LCP.

FIG. 9. Flexural modulus of FEP, LCP, and an embodiment of blended FEP and LCP. Note that the flexural modulus of the blend is lower than for the unblended LCP.

FIG. 10. Maximum tensile strength of thin film made from embodiments of the FEP and LCP blend as compared to FEP alone.

FIG. 11. Young's modulus of thin film made from embodiments of the FEP and LCP blend as compared to FEP alone.

FIG. 12. Maximum flexure load of thin film made from embodiments of the FEP and LCP blend as compared to FEP alone.

FIG. 13. Flexural modulus of thin film made from embodiments of the FEP and LCP blend as compared to FEP alone.

FIG. 14. Coefficient of thermal expansion of thin film made from embodiments of the FEP and LCP blend as compared to FEP alone at five temperatures.

FIG. 15. An example of a scheme for producing a reactive polymer compatibilizer containing PFA.

FIG. 16. Examples of cyclic olefin copolymer structures.

FIG. 17. Tensile strength of LCP and FP blends according to certain embodiments.

FIG. 18. Tensile modulus of LCP and FP blends according to certain embodiments.

FIG. 19. Elongation at break of LCP and FP blends according to certain embodiments.

FIG. 20. CTE of LCP and FP blends according to certain embodiments.

FIG. 21. Dielectric constant of LCP and FP blends according to certain embodiments.

FIG. 22. Dielectric loss factor of LCP and FP blends according to certain embodiments.

FIG. 23. SEM micrograph of sample 90A pellet in the flow direction at 1300× magnification.

FIG. 24. SEM micrograph of sample 92C pellet in the flow direction at 1300× magnification.

FIG. 25. SEM micrograph of sample 92D pellet in the flow direction at 1300× magnification.

FIG. 26. Tensile strength of LCP and FP blends according to certain embodiments.

FIG. 27. Tensile modulus of LCP and FP blends according to certain embodiments.

FIG. 28. Elongation at break of LCP and FP blends according to certain embodiments.

FIG. 29. The dimension change in the z direction for LCP and FP blends according to certain embodiments.

FIG. 30. CTE of injection molded parts in the z-direction measured as the slope of the line of best fit for data in the 10-100° C. and 100-200° C. temperature ranges for LCP and FP blends according to certain embodiments.

FIG. 31. Dielectric constant measured at 16 GHz using the split cavity method for LCP and FP blends according to certain embodiments.

FIG. 32. Dielectric loss factor measured at 16 GHz using the split cavity method for LCP and FP blends according to certain embodiments.

FIG. 33. Tensile strength for certain embodiments.

FIG. 34. Tensile modulus of certain embodiments.

FIG. 35. Elongation at break of certain embodiments.

FIG. 36. Flexural modulus for certain embodiments.

FIG. 37. Dielectric constant measured at 16 GHz using the split cavity method for certain embodiments.

FIG. 38. Dielectric loss factor measured at 16 GHz using the split cavity method certain embodiments.

DESCRIPTION OF EMBODIMENTS

A. Definitions

Unless otherwise defined, all terms (including technical and scientific terms) used herein have the same meaning as commonly understood by one of ordinary skill in the art of this disclosure. It will be further understood that terms, such as those defined in commonly used dictionaries, should be interpreted as having a meaning that is consistent with their meaning in the context of the specification and should not be interpreted in an idealized or overly formal sense unless expressly so defined herein. Well known functions or constructions may not be described in detail for brevity or clarity.

The terms "about" and "approximately" shall generally mean an acceptable degree of error or variation for the quantity measured given the nature or precision of the measurements. Typical, exemplary degrees of error or variation are within 20 percent (%), preferably within 10%, more preferably within 5%, and still more preferably within 1% of a given value or range of values. Numerical quantities given in this description are approximate unless stated otherwise, meaning that the term "about" or "approximately" can be inferred when not expressly stated.

The terminology used herein is for the purpose of describing particular embodiments only and is not intended to be limiting. As used herein, the singular forms "a", "an" and "the" are intended to include the plural (i.e., "at least one") forms as well, unless the context clearly indicates otherwise.

The terms "first", "second", and the like are used herein to describe various features or elements, but these features or elements should not be limited by these terms. These terms are only used to distinguish one feature or element from another feature or element. Thus, a first feature or element discussed below could be termed a second feature or element, and similarly, a second feature or element discussed below could be termed a first feature or element without departing from the teachings of the present disclosure.

Terms such as "at least one of A and B" should be understood to mean "only A, only B, or both A and B." The same construction should be applied to longer list (e.g., "at least one of A, B, and C").

The term "consisting essentially of" means that, in addition to the recited elements, what is claimed may also contain other elements (steps, structures, ingredients, components, etc.) that do not adversely affect the operability of what is claimed for its intended purpose as stated in this disclosure. This term excludes such other elements that adversely affect the operability of what is claimed for its intended purpose as stated in this disclosure, even if such other elements might enhance the operability of what is claimed for some other purpose.

In some places reference is made to standard methods, such as but not limited to methods of measurement. It is to be understood that such standards are revised from time to time, and unless explicitly stated otherwise reference to such standard in this disclosure must be interpreted to refer to the most recent published standard as of the time of filing.

It is to be understood that any given elements of the disclosed embodiments of the invention may be embodied in a single structure, a single step, a single substance, or the like. Similarly, a given element of the disclosed embodiment may be embodied in multiple structures, steps, substances, or the like.

B. Reactive Polymer Compatibilizer Copolymer

A copolymer is described that aids in creating blends of FP and LCP. This copolymer is referred to as a reactive polymer compatibilizer (RPC). The RPC contains at least two types of monomers. In some embodiments, these monomers come from different types of molecules: fluorinated molecules and non-fluorinated monomers.

In some embodiments, RPCs can be made by mixing a functionalized fluoropolymer and a non-fluorinated monomer in an extruder. The functional group aids in polymerization of the RPC copolymer. Typically, the functional group is a moiety having an oxygen and/or a nitrogen. Examples of functional groups that are useful to encourage polymerization include carboxyl, hydroxyl, epoxy, amine, carboxyl ester, ester, and COF.

The functionalized fluoropolymer contains a number of functionalized monomers. A given functionalized monomer may have two or more functional groups, which may be of the same kind or different from one another. For example, a monomer may contain two carboxyl moieties. In further embodiments of the RPC copolymer, a fluorine-containing monomer may contain a carboxyl and a hydroxyl, a carboxyl and an epoxy, a carboxyl and an amine, a carboxyl and a carboxyl ester, a carboxyl and an ester, and a carboxyl and a COF. In further embodiments of the RPC copolymer, a fluorine-containing monomer may contain a hydroxyl and an epoxy, a hydroxyl and an amine, a hydroxyl and a carboxyl ester, a hydroxyl and an ester, and a hydroxyl and a COF. In further embodiments of the RPC copolymer, a fluorine-containing monomer may contain an epoxy and an amine, an epoxy and a carboxyl ester, an epoxy and an ester, and an epoxy and a COF. In further embodiments of the RPC copolymer, a fluorine-containing monomer may contain an amine and a carboxyl ester, an amine and an ester, and an amine and a COF. In further embodiments of the RPC, a fluorine-containing monomer may contain a carboxyl ester and an ester, and a carboxyl ester and a COF. In further embodiments of the RPC copolymer, a fluorine-containing monomer may contain an ester and a COF. In a preferred embodiment, a fluorine-containing monomer has two functional groups. Further embodiments of the fluorine-containing monomer may have 1-6 functional groups. Specific embodiments of the fluorine-containing monomer have 1, 2, 3, 4, 5, or 6 functional groups.

In some embodiments, the fluorine-containing molecule is fully fluorinated (i.e., composed of fluorine and carbon) except for the functional group or groups. Some embodiments of a fluorine-containing monomer are composed of carbons saturated with fluorine except for the functional group; in other embodiments, one or more double or triple bonds may be present. Specific examples of suitable fluoropolymer molecules include fluorinated ethylene propylene (FEP), functionalized FEP, perfluoroalkoxy alkane (PFA), functionalized PFA, tetrafluoroethylene-perfluoroalkyl vinyl ether copolymer, functionalized tetrafluoroethylene-perfluoroalkyl vinyl ether copolymer, ethylene tetrafluoroethylene (ETFE), functionalized ETFE, polychlorotrifluoroethylene (PCTFE), and functionalized PCTFE. In an embodiment the fluorinated molecule is a dicarboxy FEP, such as the structure shown below:

[Chem. 1]

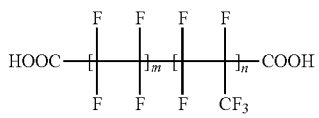

where m and n are at least 1. In another embodiment, the fluorinated molecule is a dicarboxy tetraethylene-perfluoro (alkyl vinyl ether) copolymer, such as the structure shown below:

[Chem. 2]

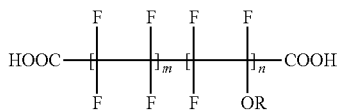

where m and n are at least 1.

In some embodiments, the non-fluorinated monomer is a monomer of a liquid crystal polymer. In this context, the monomer of the liquid crystal polymer may be any monomer of any liquid crystal polymer known in the art, or an aromatic compound having at least two functional groups. The aromatic compound may be a monoaromatic compound or a polyaromatic compound. Specific embodiments of the non-fluorinated monomer are a monoaromatic or diaromatic compound. The following are non-limiting examples of suitable liquid crystal monomers.

[Chem. 3]

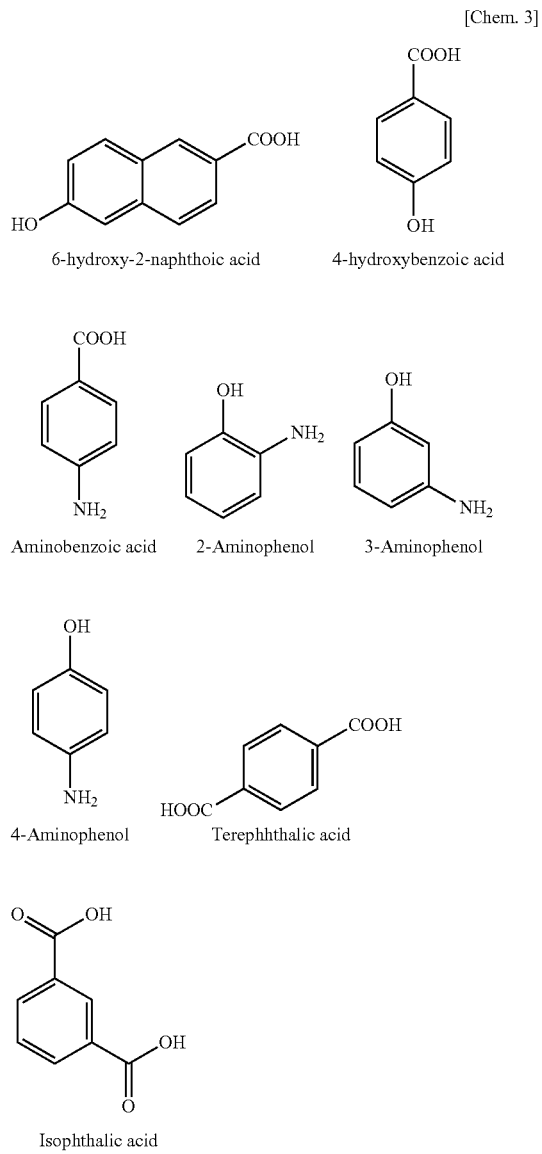

In further embodiments of the liquid crystal monomer, the monomer is a monomer of a specific LCP, such as polyparaphenylene terephthalamide (KEVLAR). In embodiments in which the liquid crystal monomer is a monomer of KEVLAR, the RPC copolymer may contain one or both of the monomers 1,4-phenylene-diamine (para-phenylenediamine) and terephthaloyl chloride. Alternative embodiments of the copolymer may contain monomers of the aromatic polyester LCP VECTRAN, which has the following structure:

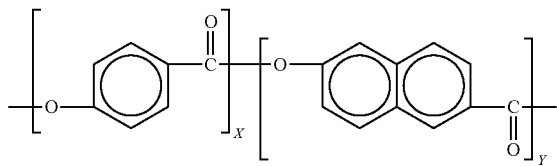

[Chem. 4]

where x and y are at least 1. In such embodiments, the RPC copolymer may contain one or both of the monomers 4-hydroxybenzoic acid and 6-hydroxynaphthalene-2-carboxylic acid. The foregoing non-fluorinated monomers may be present in any combinations. The RPC copolymer may contain multiple species non-fluorinated or LCP monomers. Various embodiments of the copolymer may contain 1-12 species of non-fluorinated or LCP monomers. Specific embodiments of the RPC copolymer contain one species of non-fluorinated monomer or two species of fluorinated monomer. In some embodiments, the RPC copolymer contains the same species of liquid crystal monomer as the LCP in the LCP/FP blend.

In further embodiments, the RPC copolymer contains three types of molecules: a fluorinated molecule, a non-fluorinated monomer, and a linking molecule. The linking molecule is chosen for its molecular flexibility. This linking molecule may contain aliphatic chains or ether functional groups to provide molecular flexibility. In a some embodiments, the linking molecule is sourced from a polymeric rubber. In some embodiments, the linking molecule contains reactive functional groups, such as amine, carboxylic acid, ester, or anhydride. In some embodiments, the linking molecule contains at least 2 reactive functional groups. In some embodiments of the RPC copolymer, the non-fluorinated monomers may be chosen from the LCP monomer species discussed herein.

In some embodiments, the RPC copolymer contains only non-fluorinated moieties. In these embodiments, there are two, three, or more classes of non-fluorinated molecules present in the copolymer. In the disclosed embodiments, one of these classes of monomer is the LCP monomers discussed previously. In some embodiments, a molecule containing molecularly flexible linking moieties may be used. In some embodiments, a non-fluorinated monomer has been functionalized to add reactive functional groups, such as, for example, amine, anhydride, carboxylic acid, or hydroxyl to the polymer. In some embodiments, functional groups on the non-fluorinated polymer are chosen such that they can react in a facile way with any functional groups present on the flexible linking molecule.

In some embodiments of an RPC copolymer, a fluorine-containing molecule will be present at a certain weight: weight ratio compared to the non-fluorinated molecule. For example, when the fluorine-containing molecule is present at the same mass concentration as the non-fluorinated molecule, the ratio of the fluorine-containing molecule to the non-fluorinated molecule is 1:1. Some embodiments of the copolymer have a ratio of the fluorine-containing molecule to the non-fluorinated molecule of 1:10 to 10:1. Further embodiments of the RPC copolymer have the said ratio of 1:10-3:1, 1:10-1:1, 1:10-1:3, 1:3-1:1, 1:3-3:1, 1:3-10:1, 1:1-3:1, 1:1-10:1, or 3:1-10:1. Specific embodiments of the RPC copolymer have a ratio of the fluorine-containing molecule to the non-fluorinated molecule selected from 1:10, 1:3, 1:1, 3:1, and 10:1. In this context the "fluorine-containing molecule" can refer to multiple species of fluorine-containing molecule that together constitute a fluorine-containing molecule fraction of the copolymer. Likewise, in this context the "non-fluorinated molecule" can refer to multiple species of non-fluorinated molecule that together constitute a non-fluorinated molecule fraction of the copolymer.

C. Compatibilizer Composition

A compatibilizer composition is described, useful for compatibilizing LCP and FP. The composition comprises the RPC copolymer described above.

In a preferred embodiment, the compatibilizer composition is a compatibilizer blend, including a certain amount of a fluoropolymer. The fluoropolymer may be chosen based on the identity of the fluoropolymer in the ultimate FP/LCP blend (described in more detail below). In some embodiments of the compatibilizer blend, the fluoropolymer is the same compound as the fluoropolymer in the ultimate FP/LCP blend. The fluoropolymer in the compatibilizer blend may be partially fluorinated or fully fluorinated; in a preferred embodiment, it is fully fluorinated. In some such embodiments, the fluoropolymer in the compatibilizer blend has no functional groups, to prevent participation in polymerization reactions during formation of the RPC copolymer. In this context, "functional groups" refers to the same moieties as described above regarding the fluorinated molecules of the RPC copolymer. Specific examples of suitable nonfunctionalized fluoropolymers in the compatibilizer blend are FEP, PFA, ETFE, PTFE, PVF, PVDF, PCTFE, ECTFE, FFPM/FFKM, FPM/FKM, FEPM, PFPE, PFSA, and combinations of two or more of the foregoing. In a specific embodiment, the non-functionalized fluoropolymer is FEP. In a further specific embodiment, the non-functionalized fluoropolymer is PFA.

A small molecules compatibilizer may be added to the compatibilizer composition, although in some embodiments of the LCP/FP blend a small molecule compatibilizer will be added to the blend after the compatibilizer composition has been prepared. Various small molecule compatibilizers may be used, including but not limited to a bis(oxazoline) compound, a carbonyl diimidazole compound, and an epoxy compound. In one preferred embodiment, the small molecule compatibilizer is 1,1'-carbonyl diimidazole. In another preferred embodiment, the small molecule compatibilizer is 1,3-phenylene-bis-oxazoline. Other suitable small molecule compatibilizers are shown below:

1,4-Bis(4,5-dihydro-2-oxazoly)benzene

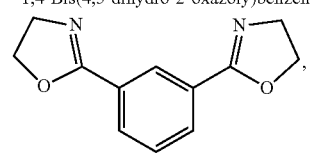

1,3-Bis(4,5-dihydro-2-oxazolyl)benzene

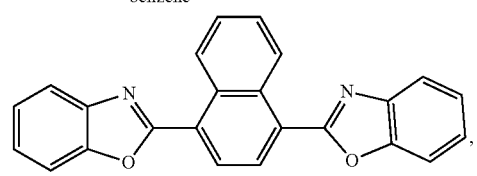

1-4-Bis(2-benzoxazolyl)naphthalene

[Chem. 5]

-continued

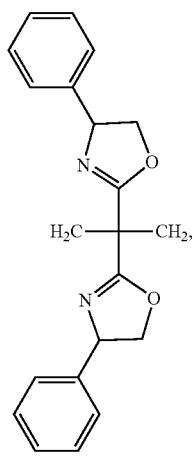

(S,S)-2,2'-
Isopropylidenebis
(4-isopropyl
-2-oxazalone)

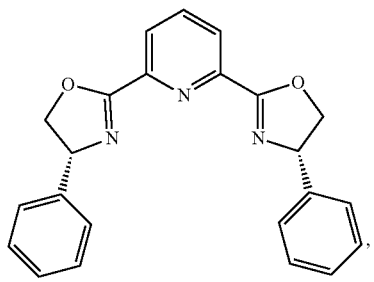

(R,R)-2,6-Bis(4-phenyl-2-oxazolin-2-yl)
pyridine

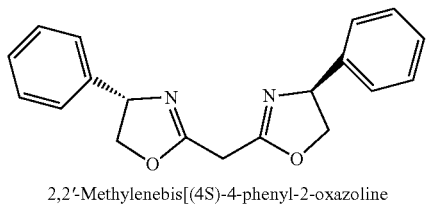

2,2'-Methylenebis[(4S)-4-phenyl-2-oxazoline

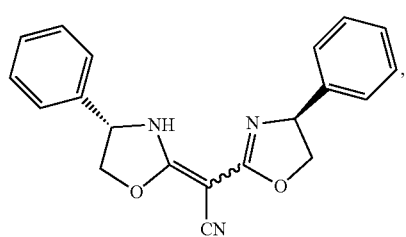

(4S)-(+)-Phenyl-α-[(4S)-phenyloxazolidin-2-ylidene]
-2-oxazoline-2-acetonitrile

-continued

[Chem. 6]

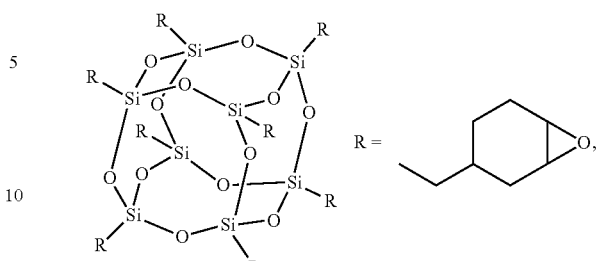

EP0408 (epoxycyclohexyl POSS cage mixture)

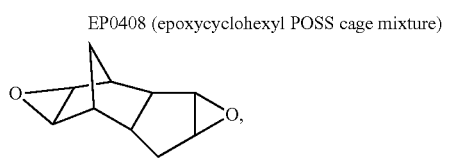

dicyclopentadiene dioxide
(mixture of endo and
exo isomers)

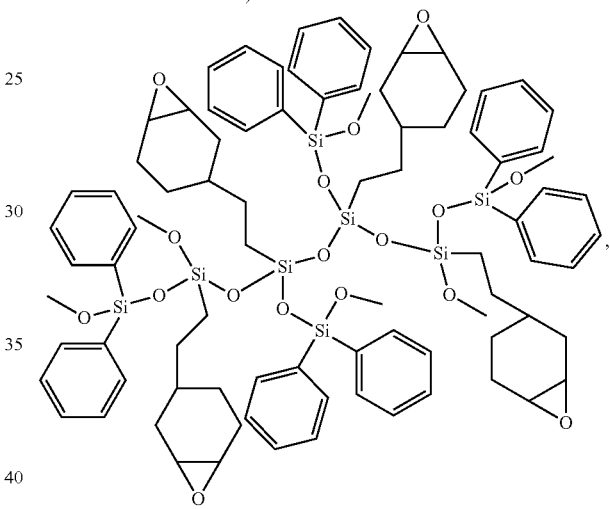

POSS phenyl epoxy

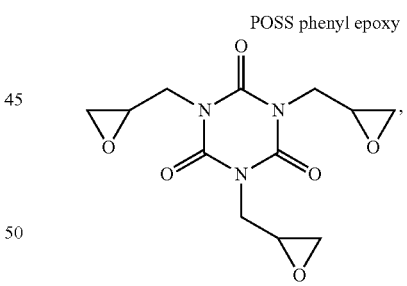

triglycidyl isocyanurate

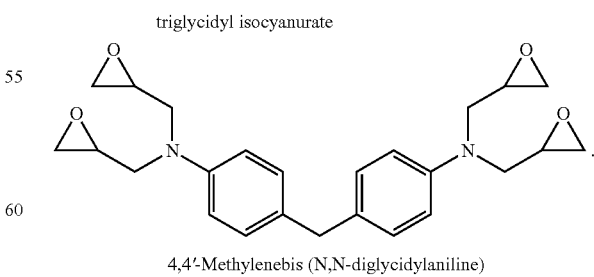

4,4'-Methylenebis (N,N-diglycidylaniline)

The small molecule compatibilizer may be present at various concentrations. Measured as the mass percentage of the monomers, fluoropolymer, RPC compatibilizer, and small molecule compatibilizer, the small molecule compatibilizer may be present in the FP/LCP blend at 0.01-5.0%, 0.02-4.5%, 0.03-4.0%, 0.05-3.5%, 0.07-3.0%, 0.1-2.5%, 0.3-2.0%, 0.5-1.5%, 0.8-1.2%, and 1%.

The compatibilizer composition can be prepared by various approaches. A method for producing the compatibilizer composition is described comprising: making a RPC copolymer by mixing a fully fluorinated fluoropolymer with a fluorinated molecule with reactive groups and a liquid crystal monomer, and making the compatibilizer composition by mixing the copolymer in an extruder. Polymerization of the fluorinated monomer with the liquid crystal monomer occurs during extrusion in such a process. Some embodiments of the RPC copolymer are suitable to be stored for later use, although in some embodiments of the process, the RPC copolymer blend is added to a mixture of an LCP and a FP shortly after it is produced.

The RPC copolymer may contain one or more functionalized fluorinated monomers and one or more LCP monomers. These may be any monomers or molecules that are described above as suitable for incorporation into the LCP/FP RPC. In some embodiments, such monomers or molecules may also be present in relative amounts as described above in the RPC copolymer.

D. Polymer Blend

Some embodiments of the RPC copolymer and compatibilizers described are useful in a compatibilized blend of an LCP and an FP. Many of the polymer blends thus produced have good mechanical properties (similar to pure LCP) combined with good chemical resistance (similar to pure FP). Various FP may be used in the blend, including but not limited to FEP, PFA, ETFE, PTFE, PVF, PVDF, PCTFE, ECTFE, FFPM/FFKM, FPM/FKM, FEPM, PFPE, PFSA, and combinations of two or more of the foregoing. In a specific embodiment, the FP is FEP. In a further specific embodiment, the FP is PFA. Various LCP may be used in the blend, including polyparaphenylene terephthalamide (KEVLAR) and LCP VECTRAN. Further suitable LCPs may be polymers of 6-hydroxy-2-naphthoic acid, 4-hydroxybenzoic acid, aminobenzoic acid, aminophenol, terephthalic acid, and isoterephthalic acid. Further suitable LCPs may be copolymers of one or more of 6-hydroxy-2-naphthoic acid, 4-hydroxybenzoic acid, aminobenzoic acid, aminophenol, terephthalic acid, and isoterephthalic acid. Either of the LCP or FP may be independently selected from a random copolymer, a homopolymer, a block copolymer, an alternating copolymer, and a graft copolymer. In a specific embodiment, the LCP is a copolymer of 6-hydroxy-2-naphthoic acid and 4-hydroxybenzoic acid.

Suitable properties have been obtained using various relative proportions of FP to LCP, as illustrated in the examples below. Some embodiments of the polymer blend have a ratio of the FP to LCP of no more than 25:75 w/w. Further embodiments of the polymer blend have a ratio of FP:LCP no more than 20:80 w/w. Further embodiments of the polymer blend have a ratio of FP:LCP no more than 15:85 w/w. Further embodiments of the polymer blend have a ratio of FP:LCP no more than 10:90 w/w. Still further embodiments of the polymer blend have a ratio of FP:LCP no more than 5:95 w/w. Still further embodiments of the polymer blend have a ratio of FP:LCP of 1:20-1:4. Still further embodiments of the polymer blend have a ratio of FP:LCP of 1:10-1:5. Still further embodiments of the polymer blend have a ratio of FP:LCP of 1:10-1:5. Some embodiments of the polymer blend have a ratio of the FP to LCP of no more than 75:25 w/w. Further embodiments of the polymer blend have a ratio of FP:LCP no more than 80:20 w/w. Further embodiments of the polymer blend have a ratio of FP:LCP no more than 85:15 w/w. Further embodiments of the polymer blend have a ratio of FP:LCP no more than 90:10 w/w. Still further embodiments of the polymer blend have a ratio of FP:LCP no more than 5:95 w/w. Still further embodiments of the polymer blend have a ratio of FP:LCP of 20:1-4:1. Still further embodiments of the polymer blend have a ratio of FP:LCP of 10:1-5:1.

The polymer blend may contain any of the RPC copolymers described above; in some embodiments of the polymer blend, the RPC copolymer is part of a compatibilizer composition. The compatibilizer composition may be any described above. The compatibilizer may be present in an amount effective to compatibilize the LCP with the FP in the polymer blend. For example, the compatibilizer may be present at up to 30% w/w of the polymer blend. In a further example, the compatibilizer may be present at up to 20% w/w of the polymer blend. In a further example, the compatibilizer may be present at up to 15% w/w of the polymer blend. In some embodiments, the compatibilizer may be present at 1-30% w/w of the polymer blend. In some embodiments, the compatibilizer may be present at 2.5-25% w/w of the polymer blend. In some embodiments, the compatibilizer may be present at 5-15% w/w of the polymer blend.

The polymer blend may show various physical characteristics, as partially illustrated in the examples below. Some embodiments of the polymer blend show continuous phase and no fibrillation morphology. Some preferred embodiments of the polymer blend have a high Young's modulus. Embodiments of the polymer blend may have a Young's modulus of at least 220, 400, 500, 600, 700, or 900 MPa. Preferred embodiments of the polymer blend have a Young's modulus above that of a pure composition of one or more of the fluoropolymers in the polymer blend. A specific preferred embodiment of the polymer blend has a Young's modulus at least 200% that of a pure composition of one or more of the fluoropolymers in the polymer blend.

Some embodiments of the polymer blend have shown good maximum tensile strength, as partially illustrated in the examples below. Embodiments of the polymer blend may have tensile strengths of at least 20, 30, 35, 38, or 40 MPa. In a preferred embodiment, the polymer blend has a maximum tensile strength above that of a pure composition of the fluoropolymer.

Some embodiments of the polymer blend have shown high elongation (% elongation to failure). Some embodiments of the polymer blend have an elongation of at least 3%; further embodiments of the polymer blend have an elongation of at least 5%; further embodiments of the polymer blend have an elongation of at least 8%; further embodiments of the polymer blend have an elongation of at least 70%; further embodiments of the polymer blend have an elongation of at least 74%. In a preferred embodiment, the polymer blend has an elongation at least equal to that of a pure composition of the fluoropolymer.

Some embodiments of the polymer blend have shown low coefficients of thermal expansion (CTE). Some embodiments of the polymer blend have a CTE at about 80° C. of no more than 180, 100, 97, or 95 ppm/° C. In a preferred embodiment, the polymer blend has a CTE at 80° C. below that of a pure composition of at least one of the fluoropolymers in the polymer blend. Some embodiments of the polymer blend have a CTE at about 100° C. of no more than 200, 195, or 95 ppm/° C. In a preferred embodiment, the polymer blend has a CTE at about 100° C. below that of a pure composition of at least one of the fluoropolymers in the polymer blend. Some embodiments of the polymer blend have a CTE at 120° C. of no more than about 200 or 150 ppm/° C. In a preferred embodiment, the polymer blend has a CTE at about 120° C. below that of a pure composition of at least one of the fluoropolymers in the polymer blend. Some embodiments of the polymer blend have a CTE at 180° C. of no more than 200 ppm/° C. In a preferred embodiment, the polymer blend has a CTE at about 180° C. below that of a pure composition of at least one of the fluoropolymers in the polymer blend. In a specific preferred embodiment, the polymer blend has a coefficient of thermal expansion at 80, 100, 120, 150 and 180° C. below that of a pure composition of at least one of the fluoropolymers in the polymer blend. In a further specific embodiment, the polymer blend has a Young's modulus of at least 500 MPa, an elongation to failure of at least 70%, and a coefficient of thermal expansion at about 100° C. of below 100 ppm/° C.

Some embodiments of the polymer blend have displayed high temperatures at which 5% weight loss occurs. Some embodiments of the polymer blend have a temperature of 5% weight loss in $N_2$ above 480° C. A preferred embodiment of the polymer blend has a temperature of 5% weight loss in $N_2$ no more than that of a pure composition of at least one of the fluoropolymers in the blend.

Embodiments of the polymer blend have shown low glass transition temperatures. Some embodiments of the polymer blend have a glass transition temperature below 100° C. A preferred embodiment of the polymer blend has a glass transition temperature that is the same as a pure composition of at least one of the fluoropolymers in the polymer blend.

Embodiments of the polymer blend have shown good flexural load characteristics. Some embodiments of the polymer blend have a flexural stress at maximum flexure load that is about the same as a pure composition of at least one of the fluoropolymers in the blend. Further embodiments of the polymer blend have a flexural modulus above 600 MPa. Further embodiments of the polymer blend have a flexural modulus above 1,000 MPa. Further embodiments of the polymer blend have a flexural modulus at least 120% relative to at least one of the pure fluoropolymers in the blend. Still further embodiments of the polymer blend have a flexural modulus at least 200% relative to at least one of the pure fluoropolymers in the blend. Some embodiments of the polymer blend have a flexural modulus of at least 800%, at least 1,000%, at least 1,200%, or at least 1,400% relative to at least one of the pure fluoropolymers in the blend.

Embodiments of the polymer blend have been observed to have dielectric properties particularly suitable for use in electronics applications. Some embodiments of the polymer blend have a dielectric constant at 10 GHz of 2-3; further embodiments of the polymer blend have a dielectric constant at 10 GHz of about 2.1. Embodiments of the polymer blend have been observed to have low dielectric loss factors as well. Some embodiments of the polymer blend may have a dielectric loss factor at 10 GHz below 0.0050. Further embodiments of the polymer blend may have a dielectric loss factor at 10 GHz of 0.0003-0.0050. Still further embodiments of the polymer blend may have a dielectric loss factor at 10 GHz of 0.0010. A preferred embodiment of the polymer blend has a dielectric loss factor at 10 GHz less than that of a pure composition of at least one of the LCP in the blend. A further preferred embodiment of the polymer blend has a dielectric loss factor at 10 GHz 20% that of a pure composition of at least one of the LCP in the blend.

Articles of manufacture of many kinds can be made using various embodiments of the polymer blend. Such articles include an extruded fiber comprising the polymer blend. Embodiments of such extruded fibers may contain over 50% w/w, at least 75%, at least 80%, at least 85%, at least 90%, at least 95%, at least 96%, at least 97%, at least 98%, at least 99%, or 100% w/w of the polymer blend. The polymer also finds use in the form of thin films. Embodiments of such thin films may contain over 50% w/w, at least 75%, at least 80%, at least 85%, at least 90%, at least 95%, at least 96%, at least 97%, at least 98%, at least 99%, or 100% w/w of the polymer blend. Further articles of manufacture include an insulator for a communications cable, a printed circuit board, a tape, twisted pair high speed cable for automotive, thin film for high temperature capacitors and coating for down-hole oil & gas drilling, fibers for 3D printed article, single and multi-fiber for woven and non-woven substrates for filtration, proton exchange membrane and printed circuit boards, thin film substrate 1-1000 microns thick for printed circuit boards, wire & cable for down-hole cable, tape wrap for electrical insulation, inorganic fillers for tapes (aluminum hydroxide, ceramic glass, $SiO_2$, fluorosilicate glass), thermal conductive additives, foam for wire & cable, an automobile comprising any of the foregoing, an electric vehicle comprising any of the foregoing, and an aircraft comprising any of the foregoing.

In a first aspect, a copolymer of a fluorine-containing monomer and a liquid crystal monomer is provided.

In a second aspect, a compatibilizer composition is provided, comprising: a copolymer of a fluorine-containing monomer and a liquid crystal monomer.

In a third aspect, a polymer blend is provided comprising: a fluoropolymer, a liquid crystal polymer, and a compatibilizer composition, wherein the compatibilizer composition contains a copolymer having a fluorinated or non-fluorinated monomer and a liquid crystal monomer.

In a fourth aspect, a process for producing a compatibilizer composition is provided, the process comprising: making a copolymer by mixing a fluoropolymer with a functionalized fluorinated molecule and a liquid crystal monomer; and making the compatibilizer composition by mixing the fully fluorinated fluoropolymer, fluorinated molecule, and liquid crystal monomer in an extruder.

In a fifth aspect, a process for producing a compatibilizer composition is provided, the process comprising: making a copolymer by mixing a non-fluorinated polymer with a liquid crystal monomer, and making the compatibilizer composition by mixing the copolymer constituents in an extruder.

In a sixth aspect, a process for producing a compatibilized blend of a liquid crystal polymer (LCP) and a fluoropolymer (FP) is provided, the process comprising: combining the LCP and the FP with a compatibilizer composition comprising a copolymer of a fluorine-containing molecule and a liquid crystal monomer.

In a seventh aspect, a compatibilizer composition is provided that is a product of the process comprising: making a copolymer by mixing the fully fluorinated fluoropolymer with the fluorinated molecule and the liquid crystal monomer; and making the compatibilizer composition by mixing the copolymer blend in an extruder.

In an eighth aspect, a compatibilizer composition is provided that is a product of the process comprising: making a copolymer by mixing a non-fluorinated polymer with a liquid crystal monomer, and making the compatibilizer composition by mixing the copolymer constituents in an extruder.

In a ninth aspect, a compatibilized blend of a liquid crystal polymer (LCP) and a fluoropolymer (FP) is provided that is the product of the process comprising: combining the LCP and the FP with a compatibilizer composition comprising a copolymer of a fluorine-containing molecule and a liquid crystal monomer.

In a tenth aspect, an article of manufacture comprising any of the above compositions is provided.

EXAMPLE

1. Example 1

Preparation of FEP/LCP Reactive Polymer Compatibilizers

To form the FEP/LCP RPCs described in this example 1, a fully fluorinated FEP, a carboxylated FEP, 6-hydroxy-2-naphthoic acid, and 4-hydroxybenzoic acid were all added to one bag and mixed uniformly. The amounts of each chemical used in the RPC are shown in Table 1. The LCP monomers, 6-hydroxy-2-napthoic acid and 4-hydroxybenzoic acid, were both added at one-to-one molar equivalents and totaled 5 wt % of all formulations. The carboxylated FEP was varied in each sample from 10 to 75 wt % in samples 2 to 5, respectively.

TABLE 1

Amounts of Chemicals Used in FEP/LCP RPCs

| Sample # | RPC # | FEP Carboxylated FEP (g) | FEP Fully Fluorinated FEP (g) | LCP Monomers 6-Hydroxy-2-Naphthoic Acid (g) | LCP Monomers 4-Hydroxybenzoic Acid (g) |
|---|---|---|---|---|---|
| 1 | Oligo-LCP1 | N/A | 95% (2850 g) | 2.9 wt % (86.5 g) | 2.1 wt % (63.5 g) |
| 2 | 10% EG-Oligo-LCP2 | 10% (300 g) | 85% (2350 g) | 2.9 wt % (86.5 g) | 2.1 wt % (63.5 g) |
| 3 | 25% EG-Oligo-LCP3 | 25% (500 g) | 70% (1400 g) | 2.9 wt % (57.7 g) | 2.1 wt % (42.3 g) |
| 4 | 50% EG-Oligo-LCP4 | 50% (1000 g) | 45% (900 g) | 2.9 wt % (57.7 g) | 2.1 wt % (42.3 g) |
| 5 | 75% EG-Oligo-LCP5 | 75% (1500 g) | 20% (400 g) | 2.9 wt % (57.7 g) | 2.1 wt % (42.3 g) |

Once the samples were thoroughly mixed, the mixture was fed at 4.0 to 6.0 kg/hr into the twin screw extruder (Leistritz ZSE 18 HP). Zones 1 through 8 were heated from 310° C. to 340° C. for sample 1. For samples 2-5, zones 1 through 8 were heated from 300° C. to 310° C. to reduce any possible degradation due to heat. The screw speed was kept constant at 250 rpm. All RPC samples were obtained as brown pellets.

FIG. 1 shows an example of a scheme for producing the FEP/LCP RPC. As shown in FIG. 1, the preparation of the FEP/LCP RPC occurs via polycondensation in the twin screw extruder. The step growth polycondensation is driven by the heat of the extruder and the HF produced by the fully fluorinated FEP and/or carboxylated FEP serves a Lewis acid driving the reaction. The aromatic monomers, 6-hydroxy-2-naphthic acid and 4-hydroxybenzoic acid, are effective in lowering the interfacial tension between the fully fluorinated FEP and LCP. Due to 6-hydroxy-2-napthoic acid and 4-hydroxybenzoic acid being A-B type functional monomers, both monomers can polymerize with another molecule of the sample molecular structure or other monomer. The corresponding random copolymers, monomers, and oligomers can only react with the end groups of the carboxylated FEP to produce AB or ABA type random block copolymers.

After the extrusion of all FEP/LCP RPCs, the morphologies of sample 1 (Oligo-LCP1) and sample 5 (75% EG-Oligo-LCP5) were compared by scanning electron microscopy (SEM). These two samples were chosen for comparison because of the differences in content of carboxylated FEP. The SEM images were obtained from a Joel JSM-6010Plus SEM. Cross-sections of the samples were prepared and imaged at a working distance of 10 mm using 5 kV. All images were taken between 1.0 k and 2.0 k.

FIG. 2 is a SEM image of sample 1 (Oligo-LCP1) at 1500× magnification. The image of FIG. 2 shows the presence of fibril morphology. FIG. 3 is a SEM image of sample 5 (75% EG-Oligo-LCP5) at 2000× magnification. The image of FIG. 3 shows a continuous phase and no fibrillation morphology observed throughout the sample. This indicates that sample 5 (75% EG-Oligo-LCP5) is a continuous AB and ABA block copolymer.

2. Example 2

Preparation of FEP/LCP Compatibilized Blends

After the FEP/LCP RPCs were made, the block copolymers were blended in a twin screw extruder with Vectra LCP A950, 75% EG-Oligo-LCP5, fully fluorinated FEP, and 1,1'-Carbonyldiimidazole (CDI). The amounts of each component used in the various samples are shown in Table 2 below.

[Table 2]

TABLE 2

Amounts of Components Used in FEP/LCP Compatibilized Blends

| Sample # | Vectra LCP A950 | 75% EG-Oligo-LCP5 | CDI | Fully Fluorinated FEP |
|---|---|---|---|---|
| 6 | 300 | 300 | 2 | 1398 |
| 7 | 100 | 300 | 2 | 1598 |
| 8 | 100 | 100 | 2 | 1798 |
| 9 | 300 | 100 | 2 | 1598 |
| TPL4000 | 150 | 400 | 4 | 1446 |

In all samples, the 75% EG-Oligo-LCP4 component served as a compatibilizer by lowering the interfacial tension between the Vectra LCP A950 and the fully fluorinated FEP and increasing the molecular adhesion between the Vectra LCP A950 and the fully fluorinated FEP to achieve a homogeneous blend. In addition to increasing the miscibility between the Vectra LCP A950 and the fully fluorinated FEP by using a block copolymer, CDI was employed as a reactive compatibilizer in these formulations due to its ability to react with the alcohol end groups to create a new ester bond and the carboxylic acid end groups to create a new anhydride bond.

3. Example 3

Mechanical and Thermal Properties of the FEP/LCP Compatibilized Blends

Mechanical and thermal properties of samples 6-9 and TPL4000 (shown in Table 2 above) were tested and compared to fully fluorinated FEP and Vectra LCP A950. Samples were gravity fed into a Sumitomo SE75DU injection molding machine. The feed zone was kept at 49° C. Zones 1 to 5 were heated from 304° C. to 327° C. The filling time was 5.00 seconds while the fill pressure was 10.00 kpsi. The screw was pulled back 0.3 inches at a rate of 0.2 inches/second. The samples were molded into ASTM D638 Type V for tensile testing, ASTM D790 flexural bars for dynamic mechanical analysis (DMA), and 61 mm×61 mm plaques for thermal mechanical analysis (TMA) testing.

Tensile tests were completed according to ASTM D638 using Type V tensile bars and an Instron machine model 3365. All samples were pulled at 10 mm/min until break. An Instron computer program was used to calculate Young's modulus (also known as tensile modulus), tensile strength, and elongation. Table 3 below shows the results of the tensile tests. The data represent the average of four tensile bars.

TABLE 3

Mechanical and CTE values of Samples 6-9, Vectra LCP A950, and Fully Fluorinated FEP

| Sample Number | YM (Mpa) | Max Tensile (Mpa) | CTE @ 80° C. (ppm) | CTE @ 100° C. (ppm) |
|---|---|---|---|---|
| Vectra LCP A950 | 2197 | 86 | 85 | 170 |
| Fully Fluorinated FEP | 219 | 17 | 183 | 211 |
| 6 | 853 | 21 | 96 | 192 |
| 7 | 521 | 19 | 95 | 94 |
| 8 | 512 | 18 | 98 | 97 |
| 9 | 775 | 24 | 98 | 98 |
| TPL4000 | 629 | 18 | 98 | 94 |

As can be seen in Table 3, most samples showed at least a double or triple increase in Young's modulus (YM) when compared to the fully fluorinated FEP. The samples also showed an increase in maximum tensile stress when compared to the fully fluorinated FEP. Due to the rigidity of the Vectra LCP A950, elongation decreased for all samples when compared to the fully fluorinated FEP. With respect to the CTE values, the test samples had CTE values lower than the fully fluorinated FEP at both 80° C. and 100° C. At 100° C., samples 7-9 and TPL400 showed CTE values lower than either of the fully fluorinated FEP or the Vectra LCP A950.

Samples 7, 8, and TPL4000 also underwent testing to calculate flexural modulus, maximum flexure load, and flexure stress. All 3-point flexural tests were performed according to ASTM D790-03 using a calibrated Instron and injection molded ASTM D790 flexural bars. The samples were placed on top of two metal rollers 50 mm apart in the Instron. A rod was utilized to provide a load at a rate of 1.35 mm/min. An Instron computer program was used to calculate modulus, maximum flexure load, and flexure stress at maximum flexure load. The results of these tests are shown in Table 4 below. All data represent one flexural bar.

Moreover, samples 7 and 8 underwent testing to calculate the coefficient of thermal expansion (CTE). CTE was measured by a TA Instruments TMA Q400 using 2.0 to 3.0 μm samples cut from injection molded 61 mm×61 mm plaques. Initial sample dimensions were measured using a Mitutoyo series 293 micrometer. All samples in this example 3 were run using the following method:
  1: Force 0.100 N
  2: Equilibrate at 45.00° C.
  3: Mark end of cycle 0
  4: Ramp 10.00° C./min to 100.00° C.
  5: Isothermal for 5.00 min
  6: Mark end of cycle 1
  7: Ramp 10.00° C./min to 55.00° C.
  8: Mark end of cycle 2
  9: Ramp 5.00° C./min to 190.00° C.
  10: Mark end of cycle 3
  11: Jump to 30.00° C.
  12: End of method.
CTE, α, was calculated using the following equation:

$$\alpha = (1/L_0) \cdot (\Delta L/\Delta T) \quad [\text{Math. 1}]$$

where $L_0$ represents the initial sample height at 25° C., $\Delta L$ represents the change in length in microns (μms), and $\Delta T$ represents the change in temperature in degrees Celsius (° C.). All samples were measured at change ($\Delta T$) of 5 degrees Celsius. The results of the CTE testing are shown in Table 4 below. All values reported are perpendicular, Z direction, to the flow direction of the injection molded sample.

TABLE 4

Table 4: Tensile Test, 3-Point Bend, and Thermal Mechanical Properties of Samples 7 and 8

| Mechanical Properties | Unit | Fully Fluorinated FEP | LCP | Sample 7 | Sample 8 | TPL4000 |
|---|---|---|---|---|---|---|
| Max. Tensile Strength | MPa | 17 | 86 | 19 | 18 | 18 |
| Modulus | MPa | 219 | 2197 | 521 | 512 | 629 |
| CTE @80° C. (Z Direction) | ppm/° C. | 183 | 115 | 95 | 98 | 98 |
| CTE @100° C. (Z Direction) | ppm/° C. | 211 | 170 | 94 | 97 | 94 |
| CTE @120° C. (Z Direction) | ppm/° C. | 214 | 88 | 196 | 192 | 193 |

TABLE 4-continued

Table 4: Tensile Test, 3-Point Bend, and Thermal Mechanical Properties of Samples 7 and 8

| Mechanical Properties | Unit | Fully Fluorinated FEP | LCP | Sample 7 | Sample 8 | TPL4000 |
|---|---|---|---|---|---|---|
| CTE @150° C. (Z Direction) | ppm/° C. | 222 | 88 | 293 | 191 | 288 |
| CTE @180° C. (Z Direction) | ppm/° C. | 269 | 174 | 194 | 190 | 284 |
| Max. Flexure load (3-point bend) | MPa | 21 | 166 | 23 | 19 | 29 |
| Modulus (3-point bend) | MPa | 596 | 7937 | 1174 | 941 | 834 |

As shown in Table 4, while samples 7 and 8 show an improvement in CTE values when compared to the fully fluorinated FEP, sample 8 shows improvement at 80° C., 100° C., 120° C., 150° C., and 180° C. The 3-point bend test was employed to determine the compatibility of the LCP in the fully fluorinated FEP. A control was run without the addition of an RPC copolymer. The LCP control sample showed a maximum flexure load of 166 and a modulus of 1174 Mpa. When the control is compared to sample 7, the maximum flexure load and modulus of sample 7 are much lower than the control. These values indicate an increase in compatibility. Sample 8 has lower CTEs than sample 7 but maintains the flexibility of the fully fluorinated FEP.

4. Example 4

Mechanical, Electrical, and Thermal Properties of Additional FEP/LCP Compatibilized Blends A FEP/LCP compatibilized blend, TPL4000, containing 7.5 wt % of Vectra LCP A950 was prepared according to the procedure described in Example 2. Mechanical, electrical, and thermal properties of the resulting FEP/LCP compatibilized blend (TPL4000) were tested and compared to FEP and LCP. The tensile, flexural, and CTE tests were performed using the procedures outlined in Example 3.

CTE was measured by a TA Instruments TMA Q400 using 2.0 to 3.0 μm samples cut from injection molded 61 mm×61 mm plaques. Initial sample dimensions were measured using a Mitutoyo series 293 micrometer. All samples were run using the following method:
  1: Force 0.100 N.
  2: Equilibrate at 45.00° C.
  3: Mark end of cycle 0.
  4: Ramp 10.00° C./min to 100.00° C.
  5: Isothermal for 5.00 min.
  6: Mark end of cycle 1.
  7: Ramp 10.00° C./min to 55.00° C.
  8: Mark end of cycle 2.
  9: Ramp 5.00° C./min to 190.00° C.
  10: Mark end of cycle 3.
  11: Jump to 30.00° C.
  12: End of method.
CTE, α, was calculated using the following equation:

$$\alpha = (1/L_0) \cdot (\Delta L / \Delta T) \quad \text{[Math. 2]}$$

where $L_0$ represents the initial sample height at 25° C., ΔL represents the change in length in microns (μm), and ΔT represents the change in temperature in degrees Celsius (° C.). All samples were measured at change (ΔT) of 5 degrees Celsius. The results of the CTE testing are shown in Table 4 above. All values reported are perpendicular, Z direction, to the flow direction of the injection molded sample.

Weight loss was measured by a TA Instruments TGA Q500 using a 10-20 mg extruded pellet. All samples were run using the following method:
  Step 1: Equilibrate at 45° C.
  Step 2: Ramp 10° C./min to 800° C.
From the results the 1% weight loss temperature and 5% weight loss temperature were calculated.

FIG. 4 is a graph showing the tensile modulus of the FEP/LCP compatibilized blend compared to FEP and LCP. As shown in FIG. 4, the FEP/LCP compatibilized blend shows approximately a threefold increase in tensile modulus when compared to FEP.

FIG. 5 is a graph showing the CTE of FEP, LCP, and the FEP/LCP compatibilized blend at 100° C. As can be seen in FIG. 5, the CTE of the FEP/LCP compatibilized blend is lower than both unblended polymers (i.e., the FEP and the LCP). Indeed, the CTE of the FEP/LCP compatibilized blend is nearly two times lower than the CTE of the FEP and the LCP.

With the improvements in mechanical and thermal-mechanical properties, the FEP/LCP compatibilized blend maintains good thermal stability. For instance, FIG. 6 is a graph showing the thermal stability as measured by loss in nitrogen of the FEP, LCP, and the FEP/LCP compatibilized blend. The y-axis is the temperature at which 5% weight loss was observed. As shown in FIG. 6, the FEP/LCP compatibilized blend demonstrates only a slight decrease in weight loss when compared to the FEP. In addition, FIG. 7 is a graph showing the glass transition temperatures of FEP, LCP, and the FEP/LCP compatibilized blend. As can be seen in FIG. 7, the glass transition temperature of the FEP/LCP compatibilized blend is similar to that of the FEP.

FIGS. 8 and 9 show the results of flexural testing. FIG. 8 is a graph showing the flexural stress at maximum flexure load of FEP, LCP, and the FEP/LCP compatibilized blend. As shown in FIG. 8, the maximum flexure load of the FEP/LCP compatibilized blend is lower than for the unblended LCP. FIG. 9 is a graph showing the flexural modulus of FEP, LCP, and the FEP/LCP compatibilized blend. The flexural modulus of the FEP/LCP compatibilized blend is lower than for the unblended LCP.

5. Example 5

Mechanical and Thermal Properties of Additional FEP/LCP Compatibilized Blends

Two FEP/LCP compatibilized blends were prepared according to the procedure described in Example 2. The FEP/LCP compatibilized blends TG1000 and TG2000 were prepared containing 7.5 wt % and 15.0 wt % of Vectra LCP A950, respectively. Mechanical and thermal properties of the resulting FEP/LCP compatibilized blends were tested and compared to FEP. The tensile, flexural, and CTE tests were performed using the procedures outlined in Example 3.

FIGS. 10 and 11 show the results of the mechanical tensile tests. FIG. 10 is a graph showing the maximum tensile strength of thin films made from each of the FEP/LCP compatibilized blends as compared to FEP alone. As shown in FIG. 10, the second FEP/LCP compatibilized blend (TG2000) shows an increase in maximum tensile strength when compared to FEP alone. FIG. 11 is a graph showing the Young's modulus of thin films made from each of the FEP/LCP compatibilized blends as compared to FEP alone. As can be seen in FIG. 11, the FEP/LCP compatibilized blends have Young's modulus values about three times that of the FEP alone.

FIGS. 12 and 13 show the results of the flexural tests. FIG. 12 is a graph showing the maximum flexure load of thin films made from each of the FEP/LCP compatibilized blends as compared to FEP alone. As can be seen in FIG. 12, the first FEP/LCP compatibilized blend (TG1000) had a maximum flexure load nearly the same as FEP. FIG. 13 is a graph showing the flexural modulus of thin films made from each of the FEP/LCP compatibilized blends as compared to FEP alone. As demonstrated in FIG. 13, the second FEP/LCP compatibilized blend (TG2000) had the highest flexural modulus, which is between two and three times that of the flexural modulus for FEP.

FIG. 14 shows the results of the CTE testing. FIG. 14 is a graph showing the CTE of thin films made from each of the FEP/LCP compatibilized blends as compared to FEP alone at five temperatures: 80° C., 100° C., 120° C., 150° C., and 180° C. As shown in FIG. 14, the first FEP/LCP compatibilized blend (TG1000) has a lower CTE than FEP at all temperatures. The second FEP/LCP compatibilized blend (TG2000) has a lower CTE than FEP at all temperatures except 180° C.

6. Example 6

Preparation of PFA/LCP Fibers

A reactive polymer compatibilizer was made by blending a sheared perfluoroalkoxy alkane (PFA) with a hydroxyl-1-napthoic acid monomer, a hydroxybenzoic acid monomer, and a liquid crystalline polymer (LCP). The percentage of each chemical is shown in Table 5 below. Once the samples were thoroughly mixed, the mixture was fed at 4.0-6.0 kg/hr into a Leistritz ZSE-18 HP-PH twin screw extruder and extruded into a pellet form. Zones 1 through 8 were heated from 340° C. to 360° C. for sample 220E. The screw was kept at a constant of 250 RPM. The compatibilizer blend pellets blend were slight grey in color.

TABLE 5

Percentage of Chemicals Utilized to Make Reactive Polymer Compatibilizer

| Sample # | Sheared PFA | Hydroxyl-1-napthoic acid | Hydroxybenzoic acid | LCP |
|---|---|---|---|---|
| 220E | 90.0% | 2.89% | 2.11% | 5.0% |

Blend formulations for the compatibilization with PFA and LCP are shown in Tables 6A and B below. The reactive polymer compatibilizer made above (sample 220E), PFA, LCP, 1,1'-carbonyldiimidazole, and silocym-A nanoparticles were added to one bag and mixed until homogeneous. As shown in Table 6, the nanoparticles were not utilized in sample 220F. The mixture was fed at 4.0-6.0 kg/hr into a Leistritz ZSE-18 HP-PH twin screw extruder and the compound was extruded into pellet form. Zones 1 through 8 were heated from 340° C. to 360° C. and the screw speed was held constant at 250 RPM. PFA/LCP blends were obtained as grey pellets.

TABLE 6

Table 6A: Amounts of Components Used in PFA/LCP Compatibilized Blends

| Sample | 220E | PFA | LCP | CDI | Nanoparticles |
|---|---|---|---|---|---|
| 220F | 20.0% | 72.3% | 7.5% | 0.2% | 0 |
| 220G | 20.0% | 72.1% | 7.5% | 0.2% | 0.15% |

TABLE 7

Table 6B: Amounts of Components Used in Additional PFA/LCP Compatibilized Blends

| Sample | Fluoropolymer | 75% RM-Oligo-LCP | CDI | LCP |
|---|---|---|---|---|
| 141D | 1446 g PFA (72.3%) | 400 g (20%) | 4 g (0.2%) | 150 g (7.5%) |
| 143B | 1598 g FEP (79.9%) | 100 g (5.0%) | 2 g (0.1%) | 300 g (15%) |
| 147D | 1446 g FEP (72.3%) | 400 g (20%) | 4 g (0.2%) | 150 g (7.5%) |
| 149E | 1528 g FEP (86.3%) | 120 g (6.8%) | 2 g (0.1%) | 120 g (6.8%) |

The PFA/LCP fibers were produced on a Leistriz ZSE 27 HP twin screw extruder equipped with a 12-hole block die with a 0.7 mm hole diameter. The screw speed was kept constant at 100 rpms and the feed rate was held constant at 3.0 kg/hr. The melt pressure was between 325 to 500 PSI. Temperatures from zone 1 to 12 were between 325° C. to 350° C. The fibers were air cooled with a pickup rate of 100 ft/min. The resulting fibers had diameters measuring from 0.09 mm to 0.2 mm.

7. Example 7

Mechanical Properties of PFA/LCP Fibers

Individual fibers were attached to paper mounts following ASTM D-3379-75 with a gauge length of 30 mm using Staples Glue Tape Permanent. A secondary line of Staples Glue Tape Permanent and a piece of paper were used to secure the fibers in place and to eliminate direct friction onto the fibers from the Instron grips. For each sample, the diameter of the fiber was measured using a Ziess SteREO Discovery V.12 microscope. The mechanical properties of the fluoropolymer and fluoropolymer alloy fibers were measured using an Instron 5582 Universal Tester. The Instron was equipped with 1 kN load cells and wedge action grips. Once each sample was loaded into the wedge action grips, the fiber mounts were cut using scissors. Tensile measurements were carried out with an extension rate of 50 mm/min until break. Using the BlueHill 2 software, the tensile strength, tensile modulus, and elongation were calculated.

Table 7 displays the mechanical properties of the fibers produced from pure PFA and the PFA/LCP compatibilized blends (shown in Table 6A) at room temperature. As shown in Table 7 below, the addition of 7.5 weight % of LCP dramatically increased the tensile strength and tensile modulus. The tensile strength of Sample 220F was 3.2 times higher than that of the PFA, while the Young's Modulus was 9.4 times higher than that of the PFA. The elongation of the PFA/LCP blends decreased compared to pure PFA. This is believed to be due to the highly crystalline nature of LCP decreasing the elasticity of blends. However, the small addition of nanoparticles within Sample 220G disrupted the crystalline areas of the LCP polymer within the blend allowing for an increase in elongation compared to Sample 220F which contains no nanoparticles.

TABLE 8

Table 7: Mechanical Properties of PFA and PFA/LCP Compatibilized Blends

| Sample | Max Tensile Strength (MPa) | Young's Modulus (MPa) | Elongation (%) |
|---|---|---|---|
| PFA | 36.4 | 450.8 | 489.8 |
| 220F | 117.8 | 4244.7 | 6.7 |
| 220G | 88 | 4186.2 | 158.4 |
| LCP* | 156 | 10000 | 2.6 |

*Data from Polymer-plastics technology and engineering, 1997, Vol.36(1), p.153-165

8. Example 8

Electrical Properties of PFA/LCP Compatibilized Blends

The electrical properties of the following samples were tested in this example: Samples of pure PFA, Samples 220F and 220G (the formulations of which are described in Table 6A), 141D, 143B, 147D, and 149E (the formulations of which are described in Table 6B). For each sample, a sample thickness was measured at four to five locations using a digital caliper and averaged. The samples were then inserted into the cavity. Measurements were made using Keysight P9374A PNA sand NIST SplitC software. In samples having defects, the best area was used to cover the cavity opening.

The electrical properties of each sample are shown in Table 8 below. More specifically, Table 8 shows the dielectric constant and the dielectric loss factor at 17 GHz of pure PFA and the PFA/LCP compatibilized blends (Samples 220F and 220G). As shown in Table 8, the dielectric constant of the PFA/LCP compatibilized blends is higher than the dielectric constant of the pure PFA. The dielectric loss factor of the PFA/LCP compatibilized blends is also higher than the pure PFA.

TABLE 9

Table 8: Electrical Properties of PFA/LCP Compatibilized Blends

| Sample ID | Dk | Df |
|---|---|---|
| Pure PFA_1 | 2.053 | 1.04E−03 |
| Pure PFA_2 | 2.052 | 1.03E−04 |
| 220F_1 | 2.133 | 1.41E−03 |
| 220F_1 2nd | 2.154 | 1.43E−03 |
| 220F_2 | 2.206 | 1.44E−03 |
| 220G_1 | 2.114 | 1.77E−03 |
| 220G_2 | 2.120 | 1.78E−03 |
| 141D_1 | 2.178 | 1.44E−03 |
| 141D_2 | 2.209 | 1.52E−03 |
| 143B_1 | 2.322 | 8.69E−04 |
| 143B_2 | 2.324 | 8.58E−04 |
| 147D_1 | 2.214 | 8.34E−04 |
| 149E_1 | 2.377 | 1.07E−03 |
| 149E_2 | 2.379 | 1.07E−03 |

9. Example 9

Preparation of Additional PFA/LCP Compatibilized Blends

PFA/LCP RPC copolymers were prepared. Sheared PFA, Vectra LCP A950, 6-hydroxy-2-naphthoic acid, and 4-hydroxybenzoic acid were all added to one bag and mixed uniformly. Amounts of each chemical are shown in Table 9 below. 6-hydroxy-2-napthoic acid and 4-hydroxybenzoic acid, LCP monomers, were both added at one-to-one molar equivalents and totaled 5 weight % of all formulations. Once the samples were thoroughly mixed, the mixture was fed at 4.0 to 6.0 Kg/hr into a Leistritz ZSE 18 HP. Zones 1 through 8 were heated from 310° C. to 340° C. for each sample. The screw speed was kept constant at 250 rpm. The PFA/LCP RPC copolymers may also be prepared with or without the presence of PFA. All RPC copolymers were obtained as brown pellets.

TABLE 10

Table 9: PFA/LCP RPC Copolymers

| Sample # | Fluoropolymer | Additive 1 | Additive 2 | Vectra LCP A950 |
|---|---|---|---|---|
| 896A | 950 g Sheared PFA | 28.9 g Hydroxy-1-Napthoic Add | 21.1 g Hydroxybenzoic Acid | N/A |
| 896B | 900 g Sheared PFA | 28.9 g Hydroxy-1-Napthoic Add | 21.1 g Hydroxybenzoic Acid | 50 g (5.0 wt %) |
| 896C | 850 g Sheared PFA | 28.9 g Hydroxy-1-Napthoic Add | 21.1 g Hydroxybenzoic Acid | 100 g (10.0 wt %) Sheared |

FIG. 15 shows an example of a scheme for producing the PFA/LCP RPC copolymers. As shown in FIG. 15, the preparation of the PFA/LCP RPC copolymer occurs via polycondensation in the twin-screw extruder. The step growth polycondensation is driven by the heat of the extruder. The HF produced by the PFA and/or the sheared PFA serves as a Lewis acid driving the reaction. Aromatic monomers, 6-Hydroxy-2-Naphthic acid and 4-Hydroxybenzoic acid, are common LCP monomers and are effective in lowering the interfacial tension between PFA and LCP. Due to 6-Hydroxy-2-Naphthoic acid and 4-Hydroxybenzoic acid being A-B type functional monomers, they both have the ability to polymerize with another molecule of the sample molecular structure or another monomer. The corresponding random copolymers, monomers, and oligomers can react with the end groups of the sheared PFA and Vectra LCP A950 to produce a random block copolymer.

To prepare the PFA/LCP compatibilized blends, carbonyldiimidazole (CDI), Vectra LCP A950, the RPC copolymer, and pure PFA were all added to one bag and mixed until homogeneous. The amounts of CDI, Vectra LCP A590, RPC copolymer, and pure PFA used in each sample are shown in Table 10 below. The mixture was then fed at 4.0 to 6.0 Kg/hr into a Leistritz ZSE 18 HP. Zones 1 through 8 were heated from 310° C. to 340° C. The screw speed was kept constant at 250 rpm. The PFA/LCP blends were obtained as off-white pellets.

TABLE 11

Table 10: PFA/LCP Compatibilized Blends

| Sample # | Fluoropolymer | RPC | CDI | Vectra LCP A950 |
|---|---|---|---|---|
| 897A | 1446 g PFA | 400 g 896A | 4 g | 150 g |
| 897B | 1446 g PFA | 400 g 896B | 4 g | 150 g |
| 897C | 1446 g PFA | 400 g 896C | 4 g | 150 g |

10. Example 10

Mechanical Properties of PFA/LCP Compatibilized Blends

The samples from Example 9 were gravity fed into a Sumitomo SE75DU injection molder. The feed zone was kept at 49° C. Zones 1 through 5, in the rotating screw, were heated from 310° C. to 340° C. Filling time was 5.00 seconds while fill pressure was 10.00 kpsi. The screw was pulled back 0.3 in at a rate of 0.2 in/second. Samples were molded into ASTM D638 Type V for tensile testing, ASTM D790 flexural bars for dynamic mechanical analysis (DMA), and 61 mm×61 mm plaques for thermal mechanical analysis (TMA) testing.

For the tensile tests, all mechanical testing of the injected molded samples was carried out using Type V tensile bars. All tensile tests were completed according to ASTM D638 using Type V tensile bars using Instron machine mod 3365. All samples were pulled at 10 mm/min until break. An Instron computer program was used to calculate Young's modulus (YM), tensile strength, and elongation. All data represents the average of four tensile bars.

For thermal mechanical analysis (TMA), coefficient of thermal expansion (CTE) was measured by a TA Instruments TMA Q400 using 2.0 to 3.0 µm samples cut from injection molded 61 mm×61 mm plaques. Initial sample dimensions were measured using a Mitutoyo series 293 micrometer. All samples were run using the following method:
1: Force 0.100 N
2: Equilibrate at 45.00° C.
3: Mark end of cycle 0
4: Ramp 10.00° C./min to 100.00° C.
5: Isothermal for 5.00 min
6: Mark end of cycle 1
7: Ramp 10.00° C./min to 55.00° C.
8: Mark end of cycle 2
9: Ramp 5.00° C./min to 190.00° C.
10: Mark end of cycle 3
11: Jump to 30.00° C.
12: End of method.

The CTE, α, was calculated using the following equation:

$$\alpha = (1/L_0) \cdot (\Delta L / \Delta T) \qquad \text{[Math. 3]}$$

where $L_0$ represents the initial sample height at 25° C., $\Delta L$ represents the change in length in microns (µms), and $\Delta T$ represents the change in temperature in degrees Celsius (° C.). All samples were measured at change ($\Delta T$) of 5 degrees Celsius.

Table 11 shows the tensile properties of the PFA/LCP compatibilized blends. The formulations of each of Samples 897A-C are shown in Table 10 above. As shown in Table 11 below, Sample 897A displayed the highest max tensile with a value of 21 MPa. While Sample 897B had the highest Young's Modulus (YM) of 826 MPa, the sample demonstrated a slight improvement in elongation compared to the PFA/LCP formulation of Sample 897C. All formulations demonstrated an increase in YM when compared to pure PFA. Samples 897A and 897B showed a slight improvement in max tensile when compared to pure PFA.

TABLE 12

Table 11: Tensile Results

| Sample | Max Tensile (MPa) | Young's Modulus (MPa) | Elongation (%) |
|---|---|---|---|
| 897A | 21.33 | 618.71 | 8.9 |
| 897B | 19.92 | 825.89 | 7.7 |
| 897C | 17.73 | 709.1 | 17.7 |
| Pure PFA | 19 | 301 | 230.9 |

Table 12 below shows the coefficient of thermal expansion (CTE) values of Samples 897A-C, pure PFA, and LCP Vectra A950. CTE values were higher for Samples 897A and 897B at 80° C. and 100° C. compared to Sample 897C, pure PFA, and LCP Vectra A950. While the CTE values for Sample 897C were 138 ppm/° C. and 141 ppm/° C. at 100° C. and 120° C., respectively, the CTE values increased at the higher temperatures (150° C. and 180° C.). At 180° C., Sample 897B had a CTE value of 117 ppm/° C., which is lower than the CTE value of LCP Vectra A950 at 180° C.

TABLE 13

Table 12: Coefficient of Thermal Expansion (CTE) Results

| Sample | CTE @ 80° C. (ppm/° C.) | CTE @ 100° C. (ppm/° C.) | CTE @ 120° C. (ppm/° C.) | CTE @ 150° C. (ppm/° C.) | CTE @ 180° C. (ppm/° C.) |
|---|---|---|---|---|---|
| 897A | 166 | 183 | 109 | 258 | 301 |
| 897B | 165 | 182 | 109 | 128 | 117 |
| 897C | 86 | 138 | 141 | 177 | 240 |
| Pure PFA | 74 | 150 | 193 | 217 | 260 |
| LCP Vectra A950 | 115 | 170 | 88 | 88 | 174 |

Tables 13 and 14 below show the storage modulus and the glass transition temperatures, respectively, of PFA and the PFA/LCP compatibilized blends. As demonstrated in Table 13, the PFA/LCP compatibilized blends exhibited higher storage modulus values than the pure PFA. Additionally, as can be seen in Table 14, the glass transition temperatures of the PFA/LCP compatibilized blends were lower than the pure PFA.

TABLE 14

Table 13: Storage Modulus Results

| Sample | Storage Modulus @ 100° C. (MPa) |
|---|---|
| 897A | 239.9 |
| 897B | 246.7 |
| 897C | 175.9 |
| Pure PFA | 107.2 |

TABLE 15

Table 14: Glass Transition Temperatures

| Sample | First Tg (° C.) | Second Tg (° C.) |
|---|---|---|
| 897A | 70.2 | 217.2 |
| 897B | 70.3 | 217.2 |
| 897C | 71.52 | 218.8 |
| Pure PFA | 95 | |

Example 11

Additional Compatibilizer Formulations

In the previous examples 1-10, all reactive polymer compatibilizers utilized fluorinated polymers and non-fluorinated monomers. In addition to these categories of materials, monomers or polymers can be added to provide molecular flexibility to the RPC copolymer. These linking molecules include flexible moieties such as aliphatic chains or ether functional groups. These linking molecules may also contain a reactive functional group such as amine. The linking molecules is used to chemically link the LCP monomers to the polymeric backbone. This allows the molecularly rigid polymerized LCP units, called mesogens, the flexibility to align with one another, thereby providing mechanical strength as well as localized domains that may be compatible with LCP polymers.

In some embodiments, fluorine-free RPC copolymers may also be used to compatibilize LCP/FP blends. To create a fluorine-free RPC copolymer, a non-fluorinated polymer is combined with non-fluorinated monomers. In some embodiments, a fluorine-free linking molecule may be used. In some preferred embodiments, the non-fluorinated polymer contains reactive functional groups such as carboxylic acid, hydroxyl, ester, and anhydride; and the non-fluorinated monomers are preferably chosen from LCP monomers such as 6-hydroxy-2-naphthoic acid and 4-hydroxybenzoic acid. Non-limiting examples of non-fluorinated polymers suitable for this purpose include the copolymers of cyclic olefins (COCs) shown in FIG. 16.

Examples of RPC copolymer formulations are shown in Table 15; values shown are weight % of initial mixture. In this example 11, each polymer contains a reactive functional group, such as, for example, carboxylic acid, hydroxyl, ester, COF, or anhydride. This functional group may be present as an end group, that is, only at the end of the polymer chain, or be present throughout the polymer chain. In this example 11, the linking molecules include a SEBS (styrene-ethylene-butadiene-styrene) thermoplastic elastomeric rubber functionalized with amine reactive groups and 2,2-bis[4-(4-aminophenoxyphenyl)] hexafluoropropane. In this example, LCP monomers 6-hydroxy-2-naphthoic acid and 4-hydroixybenzoic acid are used in a 1:1 molar ratio.

TABLE 16

Table 15. Formulations of Selected RPC Copolymers

| Sample | Functionalized PFA (%) | FEP (%) | COC (%) | Functionalized SEBS (%) | 2,2-bis[4-(4-aminophenoxyphenyl)] hexafluoropropane (%) | 6-hydroxy-2-naphthoic acid (%) | 4-hydroxy-benzoic acid (%) |
|---|---|---|---|---|---|---|---|
| 82A | 90 | 0 | 0 | 3 | 0 | 4.06 | 2.94 |
| 82B | 90 | 0 | 0 | 0 | 3 | 4.06 | 2.94 |
| 82C | 0 | 0 | 90 | 3 | 0 | 4.06 | 2.94 |
| 82D | 0 | 90 | 0 | 3 | 0 | 4.06 | 2.94 |
| 82E | 0 | 90 | 0 | 0 | 3 | 4.06 | 2.94 |

For each of the samples in this example, the components were mixed together and fed into a co-rotating twin screw extruder with the temperature profiles shown in Table 16. Zone 1 is near the feeder, while zone 8 is the die. Materials were fed into the extruder at 5.5 kg/hr and the extruder motor rotated at 300 RPM. The extrudate was cooled in a water bath and pelletized.

TABLE 17

Table 16. Extruder Temperatures for Creating Copolymer Compatibilizer

| Samples | Zone | 1 | 2 | 3 | 4 | 5 | 6 | 7 | 8 |
|---|---|---|---|---|---|---|---|---|---|
| 82A & 82B | Temperature (° C) | 295 | 300 | 305 | 310 | 315 | 320 | 320 | 325 |
| 82C-E | | 250 | 255 | 260 | 265 | 270 | 280 | 280 | 285 |

Example 12

Use of Compatibilizer to Blend LCP and Fluoropolymer

The RPC copolymers described in Example 11 can be used to compatibilize blends of liquid crystalline polymers and fluoropolymers. Additionally, linking molecules, such as functionalized SEBS rubber, can be added to the LCP/FP blends. In some embodiments, another molecule is used in addition to the RPC copolymer to improve the compatibility between the LCP and fluoropolymer. In some embodiments, this molecule is 1,3-bis(4,5-dihydro-2-oxazolyl) benzene, but molecules with a variety of functional groups are also effective. Table 17 shows the composition of some exemplary LCP/FP blends. In these blends, the fluoropolymer may or may not have a reactive functional group.

TABLE 18

Table17. Compositions of LCP/PFA Blends

| Sample | PFA (%) | LCP (%) | 1,3-bis(4,5-dihydro-2-oxazolyl) benzene(%) | CDI (%) | RPC - 82A (%) | Functionalized SEBS Rubber (%) |
|---|---|---|---|---|---|---|
| 90A | 71.2 | 17.8 | 1 | 0 | 10 | 0 |
| 92A | 68.8 | 17.2 | 1 | 0 | 10 | 3 |
| 92B | 72.0 | 18.0 | 0 | 0 | 10 | 0 |
| 92C | 79.2 | 19.8 | 1 | 0 | 0 | 0 |
| 92D | 80.0 | 20.0 | 0 | 0 | 0 | 0 |
| 92E | 71.2 | 17.8 | 0 | 1 | 10 | 0 |
| 92F | 17.2 | 68.8 | 1 | 0 | 10 | 3 |

All materials in Table 17 were fed into a co-rotating twin screw extruder at 5.5 kg/hr with the extruder motor rotating at 300 RPM. Extruder temperatures are listed in Table 18. The extrudate was cooled in a water bath and pelletized, then injection molded. All samples were injection molded at barrel temperatures of 600-626° F.

TABLE 19

Table 18. Extruder Temperatures for Creating Compatibilized LCP/Fluoropolymer Blend

| Samples | Zone | 1 | 2 | 3 | 4 | 5 | 6 | 7 | 8 |
|---|---|---|---|---|---|---|---|---|---|
| 90A, 92A-F | Temperature (° C) | 295 | 300 | 305 | 310 | 315 | 320 | 320 | 325 |

As shown in FIGS. 17-19, the tensile strength, tensile modulus, and elongation properties of injection molded parts of these blends were measured. The elongation at break of PFA is omitted for clarity; it was 485.6%±8.92%. Type V tensile bars were injection molded and tested using an Instron Universal Testing Machine at a strain rate of 10 in/min. All results are reported as averages of 5 samples unless otherwise noted and error bars represent one standard deviation. In addition, a thermomechanical analyzer (TMA) was used to determine the CTE (in the z direction) of these samples. The CTE was measured as the slope of the line of best fit for the data in a given temperature range. These results are shown in FIG. 20.

Split cavity dielectric measurements were also performed to measure Dk and Df of these materials at 16 GHz. These results are shown in FIGS. 21 and 22. The PFA sample reported here and in the following examples was pure PFA and was injection molded at a 725-770° F. Sample 92F did not create a strand from extrusion; it could not be pelletized or injection molded and therefore its results are not reported.

All samples in this example 12 had a higher tensile strength and tensile modulus than the PFA alone. All samples also had a lower elongation than PFA alone. Comparing 90A to 92E, we can see that the formulation of 90A displayed higher tensile strength. The addition of functionalized SEBS rubber to the final blends did not improve these properties, as evidenced by the lower elongation of 92A compared to 90A. All embodiments studied in this example 12 show a lower CTE at 100-200° C. than PFA alone.

Sample 90A showed the most enhanced properties. As already mentioned, 90A has superior mechanical properties to 92E and has lower CTE at 10-100° C. than sample 92A. Additionally, SEM micrographs were taken of selected samples. These are shown in FIGS. 23-25. From these micrographs, it is apparent that the presence of RPC 82A improves the compatibility of LCP/FP blends. The microstructures of 92C and 92D show much larger texture than that of 90A. This indicates that in sample 90A, the surface tension between LCP and PFA is lower, allowing for smaller LCP and PFA domains. The lowered surface tension may be a result of the RPC. Additionally, as seen in FIG. 21, the absence of the RPC results in higher dielectric constant. The use of a small molecule compatibilizer alone, as exhibited in sample 92C, does not appear to lower the surface tension between the PFA and LCP.

Example 13

Use of Various Reactive Polymer Compatibilizers in LCP/Fluoropolymer Blends

As reactive polymer compatibilizers can be useful for effective blending of LCP and fluoropolymers, each of the reactive polymer compatibilizers discussed in Example 11 were used to create exemplary fluoropolymer/LCP blends. Table 19 shows the composition of some blends of LCP and fluoropolymer compatibilized using the RPCs discussed in Example 11.

TABLE 20

Table 19. Compositions of LCP/Fluoropolymer Blends

| Sample | PFA (%) | FEP (%) | LCP (%) | 1,3-bis(4,5-dihydro-2-oxazolyl) benzene(%) | RPC (%) | RPC Sample |
|---|---|---|---|---|---|---|
| 85A | 71.2 | 0 | 17.8 | 1 | 10 | 82A |
| 85B | 71.2 | 0 | 17.8 | 1 | 10 | 82B |
| 85C | 71.2 | 0 | 17.8 | 1 | 10 | 82C |
| 88A | 0 | 71.2 | 17.8 | 1 | 10 | 82C |
| 88B | 0 | 71.2 | 17.8 | 1 | 10 | 82D |
| 88C | 0 | 71.2 | 17.8 | 1 | 10 | 82E |

All materials in Table 19 were mixed together and fed into a co-rotating twin screw extruder at 5.5 kg/hr with the extruder motor rotating at 300 RPM. Extruder temperatures are listed in Table 20. The extrudate was cooled in a water bath and pelletized. Then the samples were injection molded. All samples were injection molded at barrel temperatures of 600-626° F.

TABLE 21

Table 20. Extruder Temperatures for Compatibilized LCP/Fluoropolymer Blends

| Samples | Zone | 1 | 2 | 3 | 4 | 5 | 6 | 7 | 8 |
|---|---|---|---|---|---|---|---|---|---|
| 85A-C | Temperature (° C) | 295 | 300 | 305 | 310 | 315 | 320 | 320 | 325 |
| 88A-C | | 270 | 280 | 285 | 290 | 290 | 295 | 295 | 300 |

As shown in FIGS. 26-28, the tensile properties of injection molded parts of these blends were measured. Type V tensile bars were injection molded and tested using an Instron Universal Testing Machine at a strain rate of 10 in/min. In addition, a thermomechanical analyzer (TMA) was used to determine the CTE (in the z direction) of these samples. These results are shown in FIGS. 29 and 30. In FIG. 29, the dimension change was shifted vertically such that all curves align at roughly 25° C. for clarity. The slope of each curve corresponds to the coefficient of thermal expansion (CTE) in that temperature range. Split cavity dielectric measurements were also performed to measure Dk and Df of these materials. These results are shown in FIGS. 31 and 32.

Of these samples, sample 85A had the highest tensile strength as well as the highest elongation at break. Out of the FEP-based samples, sample 88A had the lowest tensile strength and the lowest elongation a break, while 88B and 88C performed similarly to each other. Samples 85C and 88A had significant shrinkage above 100° C., suggesting that the presence of 82C reactive polymer compatibilizer causes shrinkage at higher temperatures. The CTE at 100-200° C. for each of these embodiments is lower than that of the corresponding fluoropolymer alone. Despite this, the CTE in the z direction is still relatively high. In terms of dielectric properties, sample 85A has the lowest Dk and Df of the PFA-based samples. All the FEP-based samples showed lower dielectric loss constants than the PFA-based samples.

Example 14

Ratio of LCP to Fluoropolymer

In example 13, it is shown that there are many RPCs that may compatibilize LCP and fluoropolymers. However, in example 13, only one ratio of fluoropolymer to LCP was studied. The RPCs are capable of compatibilizing a wide range of LCP/fluoropolymer compositions. The compositions of samples in this example 14 are shown in Table 21. Note that sample 90A has the same composition and processing conditions as sample 85A, however, the samples were processed at different times. The samples in this example 14 were each mixed together and fed into a twin screw extruder at 5.5 kg/hr; the extruder was run at 300 RPM. The temperatures used were those listed in Table 20 for samples 85A-C.

TABLE 22

Table 21. Compositions of Compatibilized LCP/Fluoropolymer Blends

| Sample | PFA (%) | LCP (%) | 1,3-bis(4,5-dihydro-2-oxazolyl) benzene (%) | RPC-82A (%) |
|---|---|---|---|---|
| 90A | 71.2 | 17.8 | 1 | 10 |
| 90B | 62.3 | 26.7 | 1 | 10 |

TABLE 22-continued

Table 21. Compositions of Compatibilized LCP/Fluoropolymer Blends

| Sample | PFA (%) | LCP (%) | 1,3-bis(4,5-dihydro-2-oxazolyl) benzene (%) | RPC-82A (%) |
|---|---|---|---|---|
| 90C | 53.4 | 35.6 | 1 | 10 |
| 85D | 17.8 | 71.2 | 1 | 10 |

These samples were also injection molded under the conditions described in Example 13, and their tensile properties measured in the same manner. The tensile properties of these materials can be found in FIGS. 33-35. Sample 85D was too lubricious and slipped through the tensile grips of the Instron Universal testing machine, so its tensile properties are not reported. The flexural properties of all of the samples, including 85D and LCP alone, were measured, and are reported in FIG. 36. It has been shown that the flexural modulus and the tensile modulus of materials are generally linearly correlated, and thus the flexural modulus allows us to make inferences about the tensile modulus and other mechanical properties.

The flexural modulus of PFA has previously been measured as 399 MPa. Taking this and the measured flexural modulus of LCP as 6602, we can predict what the flexural modulus of LCP/PFA blends would be if the flexural modulus was proportional to the weighted average of only LCP and PFA components. The predicted flexural modulus for these embodiments is shown in Table 22. Note that the PFA amount used in this calculation includes the PFA in the reactive polymer compatibilizer, however, the other compatibilizing components (total of 2 wt % of the blends) are not included in this calculation. Comparing these data to that in FIG. 36, we can see that the actual flexural modulus of each of these blends exceeds what would be predicted if only the PFA and LCP are taken into account. Therefore, it is evident that the compatibilizer contributes significantly to the mechanical strength of LCP/PFA blends.

TABLE 23

Table 22. Measured and Predicted Flexural Modulus of Example 14 Samples

| Embodiment | Predicted Flexural Modulus-Weighted Average of Components (MPa) | Measured Flexural Modulus (MPa) |
| --- | --- | --- |
| 90A | 1495 | 1853 |
| 90B | 2047 | 3134 |
| 90C | 2599 | 4149 |
| 85D | 4808 | 5829 |

The dielectric properties of these embodiments were measured using the split cavity method at 16 GHz. The dielectric constant and dielectric loss factor for these embodiments are shown in FIGS. 37 and 38, respectively. A trend is observed where the higher the LCP content of a sample, the higher the Df of that sample. Therefore, the most desired sample is dependent upon the application for which it will be used. For flexible applications, sample 90A may be desired, while for applications where mechanical strength is needed, sample 85D may be more desirable.

E. Conclusions

Disclosed is a composition and method of creation of liquid crystalline polymers and fluoropolymer blends. Embodiments of the disclosed method of blending these polymers includes the synthesis and/or use of a reactive polymer compatibilizer and, in some embodiments, a small molecule compatibilizer. Embodiments of the reactive polymer compatibilizers are created by combining at least one polymer with at least one class of monomer. In some embodiments, one of the polymers is a fluoropolymer that may be a functionalized fluoropolymer containing reactive groups. However, in some embodiments, this polymer may also be a non-fluorinated polymer such as a cyclic olefin copolymer. Another component of embodiments of the reactive polymer compatibilizers are non-fluorinated monomers. In some embodiments, these non-fluorinated monomers are LCP monomers. In some embodiments, a linking molecule may be added to enhance the molecular flexibility of the reactive polymer compatibilizer and allow the constructed LCP mesogens to align in a facile manner.

It is to be understood that any given elements of the disclosed embodiments of the invention may be embodied in a single structure, a single step, a single substance, or the like. Similarly, a given element of the disclosed embodiment may be embodied in multiple structures, steps, substances, or the like.

The foregoing description illustrates and describes the processes, machines, manufactures, compositions of matter, and other teachings of the present disclosure. Additionally, the disclosure shows and describes only certain embodiments of the processes, machines, manufactures, compositions of matter, and other teachings disclosed, but, as mentioned above, it is to be understood that the teachings of the present disclosure are capable of use in various other combinations, modifications, and environments and is capable of changes or modifications within the scope of the teachings as expressed herein, commensurate with the skill and/or knowledge of a person having ordinary skill in the relevant art. The embodiments described hereinabove are further intended to explain certain best modes known of practicing the processes, machines, manufactures, compositions of matter, and other teachings of the present disclosure and to enable others skilled in the art to utilize the teachings of the present disclosure in such, or other, embodiments and with the various modifications required by the particular applications or uses. Accordingly, the processes, machines, manufactures, compositions of matter, and other teachings of the present disclosure are not intended to limit the exact embodiments and examples disclosed herein. Any section headings herein are provided only for consistency with the suggestions of 37 C.F.R. § 1.77 or otherwise to provide organizational queues. These headings shall not limit or characterize the invention(s) set forth herein.

The invention claimed is:

1. A polymer blend comprising a fluoropolymer, a liquid crystal polymer, and a compatibilizer composition, wherein the compatibilizer composition comprises a copolymer having a fluorine-containing monomer and a liquid crystal monomer.

2. The polymer blend of claim 1, wherein the compatibilizer composition further comprises a small molecule compatibilizer selected from the group consisting of a bis(oxazoline) compound, a carbonyl diimidazole compound, and an epoxy compound.

3. The polymer blend of claim 1, wherein the compatibilizer composition further comprises a linking group, and wherein the linking group (a) contains aliphatic chains or ether functional group; and/or (b) is sourced from a polymeric rubber; and/or (c) contains at least one reactive functional group selected from the group consisting of amine, carboxylic acid, ester, and anhydride.

4. The polymer blend of claim 1, wherein the compatibilizer composition further comprises a styrene-ethylene-butadiene-styrene rubber.

5. The polymer blend of claim 3, wherein the linking group is bound to repeating units having both the fluorine-containing monomer and the liquid crystal monomer.

6. The polymer blend of claim 1, wherein the compatibilizer composition further comprises a fully fluorinated fluoropolymer selected from: fluorinated ethylene propylene (FEP) or perfluoroalkoxy alkane (PFA).

7. The polymer blend of claim 1, wherein the polymer blend comprises at least 15% w/w liquid crystal polymer.

8. The polymer blend of claim 1, wherein the fluoropolymer is fluorinated ethylene propylene (FEP).

9. The polymer blend of claim 1, wherein the fluoropolymer is perfluoroalkoxy alkane (PFA).

10. The polymer blend of claim 9, wherein the polymer blend comprises at least 65% w/w PFA and at least 15% w/w liquid crystal polymer.

11. The polymer blend of claim 9, wherein the polymer blend comprises between about 68% and 72% w/w PFA, between about 17% and 20% w/w liquid crystal polymer, and between about 8% and 12% w/w compatibilizer composition.

12. The polymer blend of claim 1, wherein the liquid crystal polymer having a liquid crystal monomer that is identical to the liquid crystal monomer of the compatibilizer composition.

13. The polymer blend of claim 1, wherein the polymer blend has a flexural modulus of at least 800% of the flexural modulus of the fluoropolymer alone.

14. A polymer blend comprising a fluoropolymer, a liquid crystal polymer, and a compatibilizer composition, wherein the compatibilizer composition comprises a copolymer having a perfluoroalkoxy alkane (PFA) and at least two different liquid crystal monomers.

15. The polymer blend of claim 14, wherein the liquid crystal monomers comprise 6-hydroxy-2-naphthoic acid and 4-hydroxy-benzoic acid.

16. The polymer blend of claim 14, wherein the compatibilizer composition further comprises a styrene-ethylene-butadiene-styrene thermoplastic elastomeric rubber.

17. The polymer blend of claim 14, wherein the polymer blend has a maximum tensile strength greater than a pure composition of PFA.

18. The polymer blend of claim 14, wherein the polymer blend has a lower coefficient of thermal expansion at 100-200° C. than a pure composition of PFA.

19. The polymer blend of claim 14, wherein the polymer blend has a % elongation to failure at least 15%.

20. A polymer blend comprising a fluoropolymer, a liquid crystal polymer, and reactive polymer compatibilizer copolymer, wherein the reactive polymer compatibilizer copolymer is created from the reaction of a functionalized fluoropolymer, a linking group, and at least one LCP monomer.

21. The polymer blend of claim 1, wherein the fluorine-containing monomer is selected from the group consisting of fluorinated ethylene propylene (FEP), functionalized FEP, perfluoroalkoxy alkane (PFA), functionalized PFA, tetrafluoroethylene-perfluoroalkyl vinyl ether copolymer, functionalized tetrafluoroethylene-perfluoroalkyl vinyl ether copolymer, ethylene tetrafluoroethylene (ETFE), functionalized ETFE, polychlorotrifluoroethylene (PCTFE), and functionalized PCTFE.

* * * * *